US007526863B2

(12) United States Patent
Miyagawa et al.

(10) Patent No.: US 7,526,863 B2
(45) Date of Patent: May 5, 2009

(54) METHOD FOR MANUFACTURING A MICROSTRUCTURE

(75) Inventors: Masashi Miyagawa, Kanagawa (JP); Masahiko Kubota, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 381 days.

(21) Appl. No.: 11/108,700

(22) Filed: Apr. 19, 2005

(65) Prior Publication Data

US 2005/0181309 A1 Aug. 18, 2005

Related U.S. Application Data

(62) Division of application No. 10/191,510, filed on Jul. 10, 2002, now Pat. No. 6,960,424.

(30) Foreign Application Priority Data

Jul. 11, 2001 (JP) ............................ 2001-210933

(51) Int. Cl.
*B23P 17/00* (2006.01)
*B41J 2/015* (2006.01)
*G01D 15/00* (2006.01)

(52) U.S. Cl. .......................... 29/890.1; 29/831; 29/832; 29/833; 29/847; 29/854; 347/20; 216/27

(58) Field of Classification Search ................ 29/890.1, 29/847, 854, 831, 832, 833; 347/20, 47, 347/54, 65, 63, 45, 68–70; 430/320, 326, 430/394; 216/27, 62, 36; 264/477, 478
See application file for complete search history.

(56) References Cited

U.S. PATENT DOCUMENTS 4,609,427 A * 9/1986 Inamoto et al. ............... 216/27
4,614,706 A * 9/1986 Matsuzawa et al. ......... 430/313
4,657,631 A 4/1987 Noguchi
4,820,619 A * 4/1989 Sanada et al. ............... 430/197
4,882,595 A 11/1989 Trueba et al.
5,030,317 A * 7/1991 Noguchi ...................... 216/27

(Continued)

FOREIGN PATENT DOCUMENTS

EP 0 609 860 8/1994

(Continued)

*Primary Examiner*—David P Bryant
*Assistant Examiner*—Tai Nguyen
(74) *Attorney, Agent, or Firm*—Fitzpatrick, Cella, Harper & Scinto

(57) ABSTRACT

A method for manufacturing a microstructure comprises the steps of forming positive type resist layer (PMMA) on a base plate having heater formed thereon; forming positive type resist layer (PMIPK) on the aforesaid positive type resist layer; exposing the positive type resist layer on the upper layer to ionizing radiation of the wavelength region that gives decomposition reaction to the positive type resist layer (PMIPK) for the formation of a designated pattern by development; exposing the positive type resist layer on the lower layer to ionizing radiation of the wavelength region that givens decomposition reaction to the positive type resist layer (PMMA) for the formation of a designated pattern by development; and coating photosensitive resin film having adhesive property on the resist pattern formed by the positive type resist layer (PMMA) and positive type resist layer (PMIPK); and then, dissolving the resist pattern to be removed after the resin film having adhesive property is hardened.

2 Claims, 15 Drawing Sheets

U.S. PATENT DOCUMENTS

| | | | | | |
|---|---|---|---|---|---|
| 5,331,344 | A | * | 7/1994 | Miyagawa et al. | 347/65 |
| 5,458,254 | A | * | 10/1995 | Miyagawa et al. | 216/27 |
| 5,478,606 | A | * | 12/1995 | Ohkuma et al. | 427/555 |
| 5,686,224 | A | | 11/1997 | O'Neill | |
| 5,730,889 | A | * | 3/1998 | Miyagawa et al. | 216/27 |
| 6,158,843 | A | | 12/2000 | Murthy et al. | |
| 6,180,018 | B1 | | 1/2001 | Miyagawa et al. | |
| 6,315,853 | B1 | | 11/2001 | Kubota et al. | |
| 6,374,482 | B1 | | 4/2002 | Mihara et al. | |
| 6,426,481 | B1 | | 7/2002 | Koide et al. | |
| 6,447,984 | B1 | | 9/2002 | Tatsumi et al. | |
| 6,455,112 | B1 | | 9/2002 | Ohkuma et al. | |
| 6,472,125 | B1 | | 10/2002 | Koide et al. | |
| 6,474,769 | B1 | | 11/2002 | Imanaka et al. | |
| 6,485,132 | B1 | | 11/2002 | Hiroki et al. | |
| 6,511,162 | B1 | | 1/2003 | Kashino et al. | |
| 6,540,336 | B2 | | 4/2003 | Kubota et al. | |
| 6,569,343 | B1 | | 5/2003 | Suzuki et al. | |
| 6,591,500 | B1 | | 7/2003 | Suzuki et al. | |
| 6,659,588 | B2 | * | 12/2003 | Ikegame et al. | 347/40 |
| 6,790,309 | B2 | | 9/2004 | Miyagawa et al. | |
| 2003/0146955 | A1 | | 8/2003 | Imamura | |
| 2004/0070643 | A1 | | 4/2004 | Kubota et al. | |

FOREIGN PATENT DOCUMENTS

| | | |
|---|---|---|
| EP | 0 734 866 | 10/1996 |
| JP | 55-095324 | 7/1980 |
| JP | 4-216952 | 8/1992 |
| JP | 6-45242 | 6/1994 |
| JP | 10-291317 | 11/1998 |
| JP | 2000-326515 | 11/2000 |
| JP | 3143307 | 12/2000 |

* cited by examiner

METHOD FOR MANUFACTURING A MICROSTRUCTURE

This is a divisional application of application Ser. No. 10/191,510, filed Jul. 10, 2002.

BACKGROUND OF THE INVENTION

1. Field of the Invention

The present invention relates to a liquid discharge recording head for generating recording liquid small droplets used for ink jet recording, and a method for manufacturing such a head. More particularly, the invention relates to a method of manufacture for producing an ink flow path configuration, as well as a head using such configuration, being capable of discharging micro liquid droplets stably to provide high image quality, and also, implementing high-speed recording.

Further, the invention relates to an ink jet recording head the ink discharge characteristics of which are improved on the bases of the aforesaid method for manufacturing an ink jet head.

2. Related Background Art

The ink jet recording method (liquid discharge recording method) that performs recording by discharging recording liquid, such as ink, is generally provided with a liquid flow path, a liquid discharge energy generating portion, which is provided for a part of such liquid flow path, and a fine recording liquid discharge port (hereinafter referred to as the "orifice") that discharges liquid in the aforesaid liquid flow path by means of thermal energy given by the liquid discharge energy generating portion. Conventionally, as the method for manufacturing a liquid discharge recording head of the kind, there have been the following among some others, for example:

A method of manufacture in which after forming a through hole for supplying ink on the element base plate where the heaters that generate thermal energy for use of liquid discharge, and driver circuit and others for driving these heaters are formed, the walls of an ink flow path are formed by patterning using a photosensitive negative resist, and then, a plate having ink discharge ports formed by electro-casting or excimer laser processing is bonded to the element base plate; and A method of manufacture in which the element base plate manufactured by the same method as described above is prepared and an ink flow path and ink discharge ports are processed on a resin film (usually, polyimide is preferably used) having a bonding layer thereon by means of excimer laser, and then, the liquid flow-path structural plate thus processed and the aforesaid element base plate are adhesively bonded by applying heat under pressure.

For the ink jet head thus manufactured, it is necessary to make the distance between each heater and discharge port, which exerts influence on the discharge amount, as small as possible in order to discharge micro liquid droplets for high-quality recording. To this end, it is also necessary to lower the height of ink flow path, as well as to downsize the discharge chamber serving as the bubble generating chamber, which is a part of the ink flow path adjacent to the liquid discharge energy generating portion, and each of the discharge ports. In other words, to enable the head thus manufactured to discharge micro liquid droplets, there is a need for the application of thin film process to the formation of the liquid flow-path structure, which should be laminated on the base plate. However, it is extremely difficult to process thin film liquid flow-path structural plate in high precision and bond it to the base plate.

In order to solve the problems related to these methods of manufacture, a method for manufacturing an ink jet head has been disclosed in the specification of Japanese Patent Publication No. 6-45242, in which on the base plate the liquid discharge energy generating element is formed, a model of ink flow path is patterned using photosensitive material, and a covering resin layer is formed on the aforesaid base plate by coating to cover the model pattern, and then, the photosensitive material used for the model is removed after the formation of an ink discharge port on the covering resin layer, which is communicated with the model of the aforesaid ink flow path (hereinafter, this may be abbreviated as the "injection molding method"). For this method of head manufacture, positive model resist is used as the photosensitive material from the viewpoint of easier removal. In accordance with this method of manufacture, micro processing is possible for the formation of the ink flow path, discharge port, and others in extremely high precision, because semiconductor photolithographic technique is adopted. However, the method of manufacture that adopts such semiconductor method of manufacture fundamentally limits the configuration changes near the ink flow path and discharge port to those in a two-dimensional direction, which is parallel to the element base plate inevitably. In other words, it is impossible to arrange the photosensitive material layer to be multiple layers, because photosensitive material is used for the models of the ink flow path and the discharge port. As a result, the desired pattern, which may provide variations in the height direction, cannot be obtained for the model of the ink flow path or the like. (The configuration in the height direction from the element base plate is limited uniformly.) This inevitably presents an impediment to designing the ink flow path for the implementation of high-speed and stable discharge.

On the other hand, in the specification of Japanese Patent Laid-Open Application 10-291317, there is a disclosure that when processing a liquid flow-path structure by means of excimer laser, the processing depth of resin film is controlled by partially changing the degree of opaqueness of the laser mask so as to implement the configuration changes of the ink flow path in a three-dimensional direction, that is, the direction within the plane parallel to the element base plate, as well as in the height direction from the element base plate. The control of a laser processing of the kind in the depth direction is possible in principle, but the excimer laser, which is used for these kinds of processing, is laser having wide-band high brightness, unlike the one used for exposure of semiconductor, making it extremely difficult to implement the stabilization of laser illumination by suppressing the fluctuation of illuminating intensity within the laser illuminated surface. Particularly, for the ink jet head used for recording high-quality image, unevenness of discharge characteristics, which is thus brought about by the finish variation of the processed shapes of discharge nozzles among themselves, is recognized as unevenness of recorded image. Therefore, the enhancement of processing precision has been an important object to be materialized.

Further, taper given to the laser processed surface may often result in the incapability of forming a micro pattern.

SUMMARY OF THE INVENTION

In the specification of Japanese Patent Laid-Open Application No. 4-216952, a method is disclosed in which after a first layer of negative type resist is formed on a base plate, a desired pattern is given as a latent image, and, further, after a second layer of negative type resist is covered over the first layer, a desired pattern is given as a latent image only on the second layer, and then, lastly, patterned latent images on upper and lower layers are developed. In this method, the sensitive regions of wavelength are made different for the negative type resists used for the upper and lower layers, respectively, and both upper and lower resists are sensitive to ultraviolet (UV) rays, or the upper layer negative type resist is sensitive to ultraviolet (UV) rays, while the lower layer negative type resist is sensitive to deep-UV or ionizing radiation, such as electron rays or X-rays. In accordance with this disclosed method, it is possible to form the patterned latent image, the configuration of which is changeable not only in the direction parallel to the base plate, but also, in the height direction from the base plate.

Now, therefore, the inventors hereof have assiduously made studies on the disclosed art of Japanese Patent Laid-Open Application No. 4-216952 in order to apply such art to the model injection method described above. In other words, it is considered that by the application of the disclosed art of Japanese Patent Laid-Open Application No. 4-216952 to the model formation of the ink flow path by the model injection method, the height of positive type resist, which serves as the model of the ink flow path or the like, is made locally changeable. Actually, experiments are carried out for the formation of a model having different patterns on the upper and lower parts thereof with respect to a base plate using the alkali-developed positive type photo-resist formed by mixture of alkali-soluble resin (novolac resin or polyvinyl phenol) and naphtha-quinone diazide inductor as the one sensitive to ultraviolet rays (UV), which is removable by dissolution as disclosed in the specification of Japanese Patent Laid-Open Application No. 4-216952, and polymethyl-isopropenyl ketone (PMIPK) as the one sensitive to ionizing radiation rays. However, this alkali development positive type photoresist is dissolved instantaneously in the PMIPK developer, making application impossible to the formation of the two-layered pattern.

Therefore, the inventors hereof make it a major objective to find out the preferable combination of upper layer and lower layer positive type sensitive materials with which the model injection method can be used for the formation of the model pattern having the configuration changeable in the height direction from the base plate.

The present invention is designed in consideration of those points discussed above. It is an object of the invention to provide an inexpensive but highly precise and reliable liquid discharge head, as well as a method for manufacturing such head.

Particularly, the present invention relates to a method of manufacture, which makes it possible to optimize the three-dimensional configuration of ink flow path for the formation of ink flow path, and the head provided with such flow path, that can suppress the vibrations of meniscus at high speed for refilling ink.

Also, it is an object of the invention to provide a new method for manufacturing a liquid discharge head, which is capable of manufacturing the liquid discharge head the liquid flow path of which is formed exactly in good precision, with the structure that can be precisely processed in good production yield.

Also, it is another object of the invention to provide a new method for manufacturing a liquid discharge head, which is capable of manufacturing the liquid discharge head having excellent mechanical strength and resistance to chemical substances, while making mutual influences smaller with respect to recording liquid.

In order to achieve the objects described above, the present invention has realized at first the manufacture for forming a three-dimensional configuration of liquid flow path in high precision, and then, characteristically, it has found the good configuration of liquid flow path that can be materialized by such method of manufacture.

In other words, a first invention hereof proposes a method for manufacturing a microstructure comprising the following steps of:

forming on a base plate a first photosensitive material layer to be exposed to light of a first wavelength region;

forming on the first photosensitive material layer a second photosensitive material layer to be exposed to light of a second wavelength region;

irradiating light of the second wavelength region to the surface of the base plate having the first and second photosensitive material layers formed thereon through a mask to enable only desired area of the second photosensitive material layer to react; and irradiating light of the first wavelength region to the surface of the base plate having the first and second photosensitive material layers formed thereon through a mask to enable only desired area of the first photosensitive material layer to react, wherein the upper and lower patterns are made different with respect to the base plate by use of each of the steps, and the first and second photosensitive material layers are positive type photosensitive materials, and lights of the first and second wavelength regions are ionizing radiations.

A second invention proposes a method for manufacturing a microstructure sequentially comprising the following steps of:

forming on a base plate a first positive type photosensitive material layer to be exposed to light of a first wavelength region;

forming on the first positive type photosensitive material layer a second positive type photosensitive material layer to be exposed to light of a second wavelength region;

irradiating light of the second wavelength region to the surface of the base plate having the first and second positive type photosensitive material layers formed thereon through a mask to decompose only desired area of the second positive type photosensitive material layer to react without giving decomposition reaction to the first positive type photosensitive material layer, and subsequently, forming by development a desired pattern on the second positive type photosensitive material layer on the upper layer;

irradiating light of the first wavelength region to the surface of the base plate having the first and second positive type photosensitive material layers formed thereon through a mask to decompose at least the designated area of the first positive type photosensitive material layer to react, and subsequently, forming by development a desired pattern on the first positive type photosensitive material layer on the lower layer, wherein the upper and lower patterns are made different with respect to the base plate by use of each of the aforesaid steps.

A third invention is a method for manufacturing a liquid discharge head comprising the steps of forming a model pattern by removable resin on the liquid flow-path forming portion on a base plate having liquid discharge energy generating element formed thereon; and forming liquid flow path by dissolving and removing the model pattern subsequent to coating and hardening a covering resin layer on the base plate to cover the model pattern, wherein the step of forming the model pattern sequentially comprises the following steps of:

forming on the base plate a first positive type photosensitive material layer to be exposed to light of a first wavelength region;

forming on the first positive type photosensitive material layer a second positive type photosensitive material layer to be exposed to light of a second wavelength region;

irradiating light of the second wavelength region to the surface of the base plate having the first and second positive type photosensitive material layers formed thereon through a mask to decompose only desired area of the second positive type photosensitive material layer to react without giving decomposition reaction to the first positive type photosensitive material layer, and subsequently, forming by development a desired pattern on the second positive type photosensitive material layer on the upper layer; and irradiating light of the first wavelength region to the surface of the base plate having the first and second positive type photosensitive material layers formed thereon through a mask to decompose at least the designated area of the first positive type photosensitive material layer to react, and subsequently, forming by development a desired pattern on the first positive type photosensitive material layer on the lower layer.

A fourth invention is a method for manufacturing a liquid discharge head comprising the steps of forming a model pattern by removable resin on the liquid flow-path forming portion on a base plate having liquid discharge energy generating element formed thereon; and forming liquid flow path by dissolving and removing the model pattern subsequent to coating and hardening a covering resin layer on the base plate to cover the model pattern, wherein the step of forming the model pattern comprises at least the following steps of:

forming on the base plate a first ionizing radiation decomposing type positive resist film;

forming on the first ionizing radiation decomposing type positive resist film a second ionizing radiation decomposing type positive resist film having polymethyl isopropenyl ketone as the main component thereof;

forming a desired pattern on the second ionizing radiation decomposing type positive resist film on the upper layer by development subsequent to decomposing only desired area of the second ionizing radiation decomposing type positive film to react using ionizing radiation of wavelength region giving decomposition reaction to the second ionizing decomposing type positive resist film; and forming a desired pattern on the first ionizing radiation decomposing type positive resist film on the lower layer by development subsequent to decomposing at least a designated area of the first ionizing radiation decomposing type positive film to react using ionizing radiation of wavelength region giving decomposition reaction to the first ionizing decomposing type positive resist film;

coating photosensitive covering resin film on the resist pattern formed by the first ionizing radiation decomposing type resist film and the second ionizing radiation decomposing type resist film, and forming the pattern by development subsequent to exposing the pattern containing discharge port communicated with the liquid flow path;

decomposing the resist pattern formed by the first ionizing radiation decomposing type positive resist film and the second ionizing radiation decomposing type positive resist film by irradiation of ionizing radiation having wavelength region giving decomposition reaction to both the first ionizing radiation decomposing type positive resist film and the second ionizing radiation decomposing type positive resist film; and dissolving and removing the resist pattern by dipping the base plate after completion of the steps in a designated organic solvent.

For the second or third invention, it is preferable that the positive type photosensitive material layer on the lower layer is ionizing radiation decomposing type positive resist having methacrylate as the main component thereof, and the positive type photosensitive material layer on the upper layer is ionizing radiation decomposing type positive resist having polymethyl isopropenyl ketone as the main component thereof.

Also, for the second or third invention, the ionizing radiation decomposing type positive resist, which has polymethyl isopropenyl ketone as the main component, is coated by solvent coating method on the ionizing radiation decomposing type positive resist, which has methacrylate as the main component, and if the ionizing radiation decomposing type positive resist, which has methacrylate as the main component, is thermo-bridge type formed by polymerizing the thermo-bridge component of methacrylic acid, chloride methacrylate, or glycidyl methacrylate, it is preferable to provide a step for heating the aforesaid thermo-bridge type positive resist before the aforesaid coating is effectuated by the solvent coating method.

The present invention also includes a liquid discharge head manufactured by the method for manufacturing a liquid discharge head described above.

It is preferable for the liquid discharge head manufactured by the method of manufacture embodying the present invention as described above to make the height of liquid flow path relatively low on the location adjacent to the bubble generating chamber on the liquid discharge energy generating element.

Also, it is preferable for the liquid discharge head manufactured by the method of manufacture embodying the present invention to form the column type member for catching dust particles in the liquid flow path by the same material that forms the liquid flow path in such a manner that the column member is not allowed to reach the base plate.

Also, it is preferable for the liquid discharge head manufactured by the method of manufacture embodying the present invention to form on the base plate the liquid supply port communicated commonly with each of the liquid flow paths, and make the height of the liquid flow path lower in the central portion of the aforesaid liquid supply port.

Also, it is preferable for the liquid discharge head manufactured by the method of manufacture embodying the present invention to provide a convex shape for the sectional configuration of the bubble-generating chamber on the liquid discharge energy-generating element.

DETAILED DESCRIPTION OF THE PREFRRED EMBODIMENTS

Figure 1A:
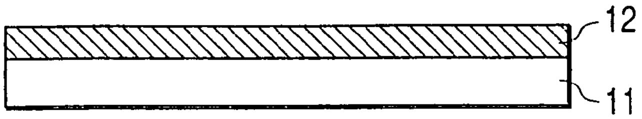
FIGS. 1A, 1B, 1C, 1D, 1E, 1F and 1G are views that illustrate the fundamental process flow of the method of manufacture in accordance with the present invention.

Next, the present invention will be described in detail.

The method of the present invention for manufacturing a liquid discharge head has an advantage, among some others, that the setting of the distance between the discharge energy generating element (heater, for instance) and the orifice (discharge port), which is one important factor that exerts influence on the characteristics of the liquid discharge head, as well as that of the positional precision between this element and the center of the orifice, can be implemented with extreme ease. In other words, in accordance with the present invention, it is made possible to set the distance between the discharge energy generating element and the orifice by controlling twice the thickness of coated film of the photosensitive material layer. The thickness of coated film of the photosensitive material layer can be controlled strictly in good reproducibility by means of the thin film coating technique conventionally in use. Also, the positioning of the discharge energy generating element and the orifice can be made optically using the photolithographic art. Then, this positioning is possible in a significantly higher precision than that of the method for bonding a flow-path structural plate to a base plate, which has been in use for the conventional method for manufacturing a liquid discharge recording head.

Also, as a soluble resist layer, polymethyl isopropenyl ketone (PMIPK), polyvinyl ketone, or the like is known. A positive type resist of the kind has the absorption peak at a wavelength of nearly 290 nm, and being combined with resist having different region of photosensitive wavelength, this type of resist makes it possible to form the model of ink flow path having two-layered structure.

Now, the method of manufacture of the present invention is characterized in that soluble resin is used to form the model of ink flow path, and that after covering it with resin that becomes the flow path member, the model material is lastly removed by dissolution. Therefore, the material used for the model, which is applicable to this method of manufacture, should be capable of being decomposed and removed. There are two kinds of resists that can dissolve the model pattern after the formation of the target pattern, that is, alkali-developed positive type photo-resist formed by mixture of alkali-soluble resin (novolac resin or polyvinyl phenol) and naphtha-quinone diazide inductor, and resist of the type that can be decomposed by emitted rays of ionizing radiation. In general, the photosensitive wavelength region of the alkali-developed positive type photo-resist lies in 400 nm to 450 nm, and the photosensitive wavelength region thereof is different from that of the aforesaid polymethyl isopropenyl ketone (PMIPK), but the alkali-developed positive type photo-resist is actually decomposed by the developer of PMIPK instantaneously. Therefore, this photo-resist is not adoptable for the formation of two-layered pattern.

On the other hand, the polymeric compound, one of resists decomposed by ionizing radiation rays, which is formed by methacrylate, such as polymethyl methacrylate (PMMA), is positive type resist having the peak thereof at the photosensitive wavelength region of 250 nm, and the speed of dissolution of non-exposed portion thereof is extremely slow in the PMIPK developer, thus being applicable to the two-layered pattern structure. Therefore, the aforesaid resist layer of polymethyl isopropenyl ketone (PMIPK) is formed on the resist (PMMA). Then, the upper layer, PMIPK, is exposed and developed, at first, at a wavelength of 290 nm. Then, the lower layer, PMMA, is exposed and developed by ionizing radiation rays at a wavelength of 250 nm. In this way, the two-layered ink flow path model can be formed. At this juncture, when the upper PMIPK layer is formed on the lower PMMA layer, the lower PMMA layer is decomposed by the PMIPK coating agent and compatibly decomposed portion is inevitably formed if usual spin coating method, such as solvent coating method, is used. Therefore, it is preferable to adopt laminating method for the formation of PMIPK film. The laminating method is such that on a resin film, such as polyethylene telephtalate, PMIPK is filmed by means of solvent coating in advance, and then, this film is thermally transferred to the PMIPK layer under pressure. The glass transition temperature of PMIPK is approximately 100° C. It is possible to transfer PMIPK film to PMMA by means of with the provision of heat at approximately 120 to 160° C.

Now, hereunder, the description will be made of the process flow of the ink flow path formation in accordance with the method of manufacture of the present invention.

FIGS. 1A to 1G are views that illustrate the process flow, and FIGS. 2A to 2D are views that illustrate the continuation of the process represented in FIGS. 1A to 1G.

As shown in FIG. 1A, the positive type resist layer 12 the main component of which is PMMA is formed on a base plate 11. This film can be formed by the general spin coating method.

Figure 1B:
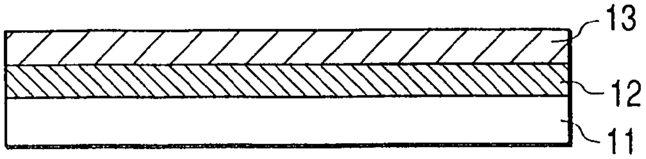

Then, as shown in FIG. 1B, a positive resist layer 13 the main component of which is PMIPK is formed on the positive resist layer 12 by means of laminating.

Figure 1C:
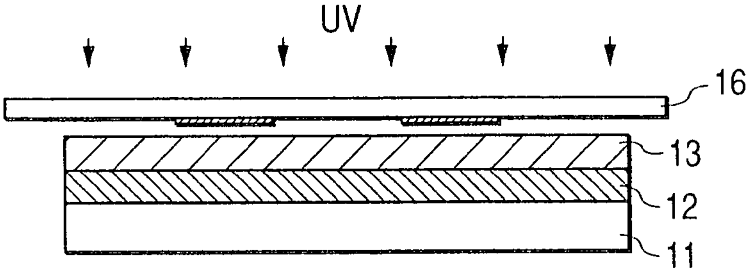

Further, as shown in FIG. 1C, the positive resist layer 13 having PMIPK as the main component thereof is exposed. For the positive resist layer 13, a photo-mask 16 is adopted so as to remove exposed portion. Here, almost no exposure is given to acrylic resist on the lower layer by use of the cold mirror the product number of which is CM-290. This is because most of light having 260 nm or more is transmitted due to acrylic absorption caused by carboxyl group, and no exposure takes place. As a result, other than the adoption of the cold mirror, it may be possible to perform exposure through a filter that cuts short wavelength of 260 nm or less.

Figure 1D:
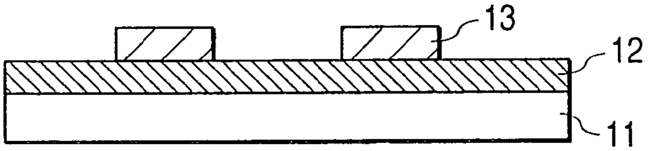

Then, as shown in FIG. 1D, the exposed positive type resist layer 13 is developed to obtain a designated pattern. It is preferable to use methyl isobutyl ketone for developer. The dissolving speed of this developer is extremely slow on non-exposed portion of acrylic resist. As a result, influence to the lower layer is very small when the upper layer is developed.

Figure 1E:
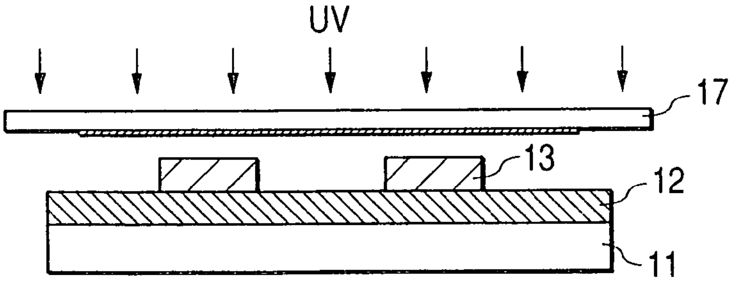

Next, as shown in FIG. 1E, the positive type resist layer 12 having PMMA as the main component thereof is exposed. For the positive type resist layer 12, the photo-mask 17 is used for removing the exposed portion. In this case, if the cold mirror the product number of which is CM-250 is used, the acrylic resist of the lower layer can be exposed. Also, if a structure is arranged so that the upper layer resist is not irradiated by light by use of the photo-mask 17, the upper layer resist is not exposed.

Figure 1F:
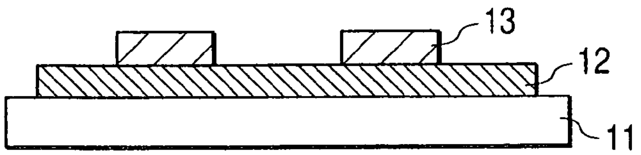

Then, as shown in FIG. 1F, the exposed positive type resist layer 12 on the lower layer is developed to obtain a designated patter. As in the case of development of the upper layer, it is preferable to use methyl isobutyl ketone for the developer. This developer gives almost no dissolution to non-exposed PMIPK. As a result, the upper layer pattern does not change when the lower layer resist is developed.

Figure 1G:
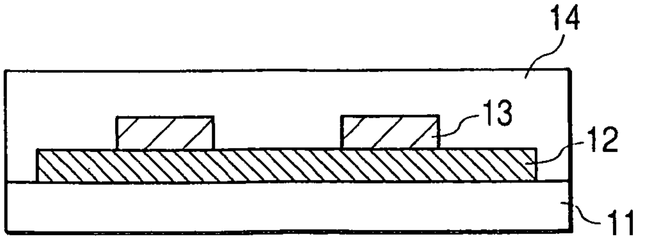

Next, as shown in FIG. 1G, liquid flow-path structural material 14 is coated to cover the resist layers 12 and 13 on the upper and lower layers thus patterned. The coating liquid-flow path structural material is the photosensitive material having epoxy resin as the main structural material as disclosed in the Japanese Patent No. 3143307. If xylene or other aromatic solvent is preferably used for dissolving this photosensitive material for coating, it becomes possible to prevent compatible solution with PMIPK.

Figure 2A:
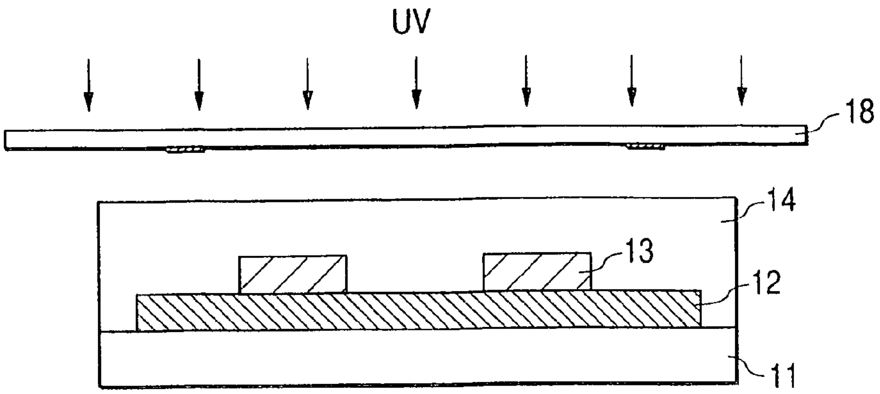
FIGS. 2A, 2B, 2C and 2D are views that illustrate the continuation of the process flow shown in FIGS. 1A, 1B, 1C, 1D, 1E, 1F and 1G.

Further, as shown in FIG. 2A, the liquid flow-path structural material 14 is exposed. In general, liquid flow-path structural material 14 having negative type property is used. Therefore, it is arranged to adopt the photo-mask 18, which does not allow light to be irradiated to the portion becoming discharge port.

Figure 2B:
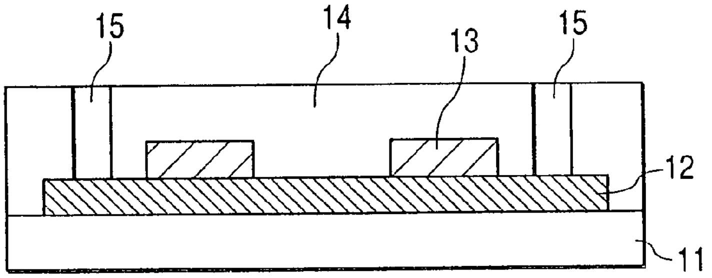

Then, as shown in FIG. 2B, the layer of the liquid flow-path structural material 14 is developed to form the discharge port 15. It is preferable to use aromatic solvent, such as xylene, for the development. This solvent does not dissolve PMIPK, hence making it possible to keep the model material in good shape.

Figure 2C:
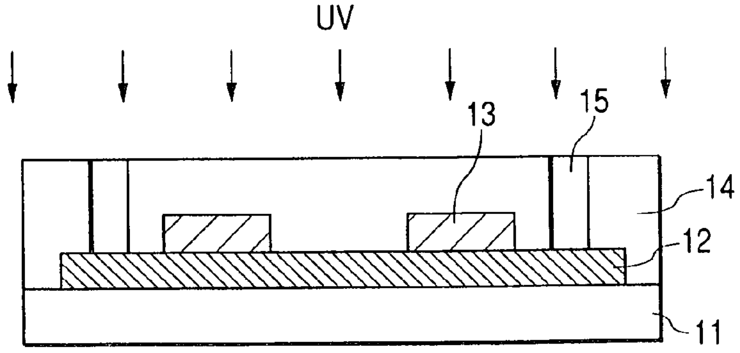
Figure 2D:
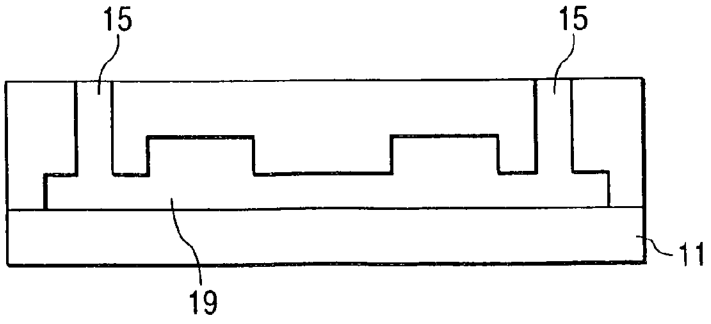

Next, as shown in FIG. 2C, by means of total exposure, the positive type resist layers 12 and 13 serving as the model material are resolved. With the irradiation of light having a wavelength of 300 nm or less, resist material of the upper layer and lower layer is resolved into low molecular compound to make it easier to be removed by use of solvent.

Lastly, the positive type resist layers 12 and 13 serving as the model material of the liquid flow path are removed by use of solvent. In this process, the liquid flow path 19, which is communicated with the discharge port 15, is formed as shown in the cross-sectional view in FIG. 2D. The liquid flow path 19 of the present invention constitutes a part of liquid flow path, being in a configuration that the height of the flow path is made lower in the vicinity of the discharge chamber, which is a bubble generating chamber to be in contact with heater (liquid discharge energy generating portion). In the removal process of the model material using solvent, it is possible to make the time of dissolving removal shorter with the provision of ultrasonic waves or mega-sonic vibrations.

Figure 3A:
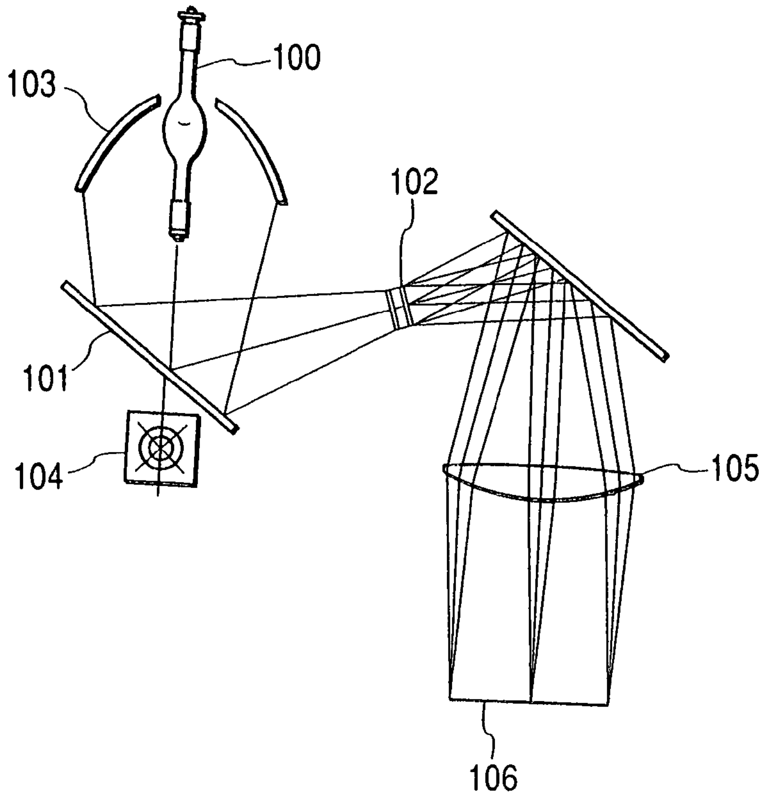
FIG. 3A is a view that schematically shows the optical system of an exposure device generally in use.
Figure 3B:
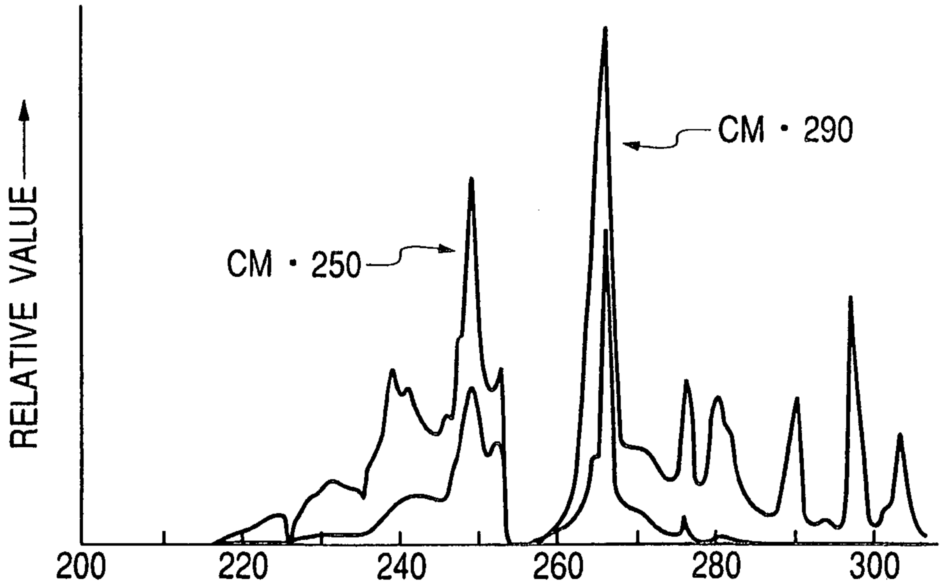
FIG. 3B is a view that shows the reflection spectra of two kinds of cold mirrors.

Here, in FIG. 3A, the optical system of a proximity exposure device, which is used as a general exposure device, is schematically shown. This system is structured in such a way that by use of a reflection condenser 100, ultraviolet rays or far-ultraviolet rays emitted from a high-pressure mercury lamp (500 W, Xe—Hg lamp) 100 are reflected toward a screen 104, and then, light of desired wavelength is selected by use of the cold mirror 101, which reflects only light having wavelength needed for resist exposure, and that after being enlarged uniformly by use of a fly-eye lens 102, light thus selected is irradiated to resist (not shown) through a condenser lens 105, a projection optical system, and a mask 106. This is arranged in order to prevent the patterning precision from being lowered due to heat conversion of light having unwanted wavelength for the exposure of resist when all the light is reflected. FIG. 3B is a view that shows the spectral spectra of reflected lights when using the cold mirrors CM-250 and CM-290, respectively, which are installed on the mask aligner PLA-621FA manufactured by Canon Incorporation. In this way, it is possible to produce an ink jet head provided with the ink flow path the height of which is partially different in the process flow shown in FIGS. 1A to 1G and FIGS. 2A to 2D by exposing and patterning two kinds of different resists using two kinds of exposure wavelength having different wavelength region.

It is more preferable to use thermo-bridge positive type resist for the lower layer resist. Then, the margin of the aforesaid process can be enhanced. In the process shown in FIGS. 1A to 1G and FIGS. 2A to 2D, PMIPK is processed to be dry film, and laminated on PMMA for the formation of the resist layer of the two-layered structure. The film thickness distribution of the dry film varies approximately 10% plus or minus due to volatilization of solvent at the time of film production. Therefore, if the upper layer is coated with PMIPK layer by use of spin coating method generally in use, the film thickness precision is significantly improved.

The PMIPK layer can be formed by the solvent coating method generally in use if the lower layer resist is processed to be of thermo-bridge type, which makes it possible to eliminate the influence of the lower layer resist that may be exerted by the solvent used for coating the upper layer. Further, the influence that may be exerted by the developer when the upper layer resist is developed is not given to the lower resist layer at all. In this manner, the process margin is significantly enhanced.

The thermo-bridge positive type resist is the positive type ionizing radiation resist, which is disclosed by E. D. Roberts (American Chemical Society 1980, 43, 231-5), and it has a thermally bridgeable unit and the structural unit that can be decomposed by ionizing radiation. The thermo-bridge type resist enables thermo-bridge group to react by pre-baking subsequent to spin coating. As a result, even if the upper layer PMIPK is spin coated, the coating solvent used therefore does not dissolve the lower layer. Also, when PMIPK is developed, no dissolution takes place by the developer. Thus, the process margin can be expanded. Also, methacryloy group, which is decomposed by ionizing radiation, is provided. Therefore, if the filmed bridge is given ionizing radiation altogether, it is resolved into low molecular compound, which can be removed quickly in the last process of removing the model resist.

The most preferable thermo-bridge type resist for the present invention is methacrylate, which is copolymerized with methacrylic acid, chloride methacrylate, glycidyl methacrylate, or the like as bridging group. As methacrylate, there is methyl methacrylate, ethyl methacrylate, butyl methacrylate, phenyl methacrylate, or the like.

It is preferable to optimize the copolymerization ratio of the bridge component in accordance with the film thickness of the lower layer resist. The more bridge component, the lesser becomes sensitivity, requiring more time for exposure. On the other hand, if the bridge component is made smaller, there often occur cracks in a thick film at the time of development. The polymerization ratio of bridge component is preferably applicable at 1 to 20 mol %, and more preferably, at 5 to 10 mol %.

FIGS. 4A to 4G and FIGS. 5A to 5D are views that illustrate the most preferable process that uses thermo-bridge positive type resist as the lower resist. FIGS. 5A to 5D illustrate the continuation of the process shown in FIGS. 4A to 4G.

Figure 4A:
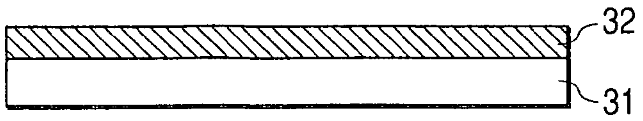
FIGS. 4A, 4B, 4C, 4D, 4E, 4F and 4G are views that illustrate the process flow when using thermo-bridge type methacrylate resist for the lower layer in accordance with the method of manufacture in accordance with the present invention.

In FIG. 4A, the thermo-bridge positive type resist layer 32 is coated on the base plate 31 and baked. For coating, the generally used solvent coating method, such as spin coating or bar coating, is adopted. Also, it is preferable to set the baking temperature at 160 to 220° C. at which the thermo-bridge reacts.

Figure 4B:
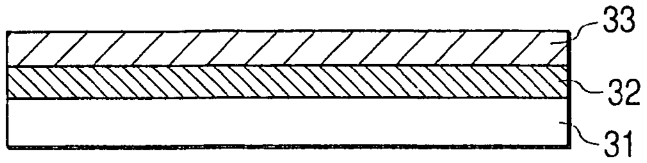

Then, as shown in FIG. 4B, the positive type resist 33, the main component of which is PMIPK, is coated on the upper layer of the thermo-bridge positive type resist, and baked. In general, the lower layer is slightly decomposed by the coating solvent when PMIPK on the upper layer is coated, and compatible layer is formed. However, the structure here being of the thermo-bridge type, there is no formation of compatible layer at all.

The baking temperature in this case is set at the usual PMIPK baking temperature without any problem, but a hot plate or the like is used for baking, the temperature should often be set higher by approximately 10 to 20° C. for implementing the formation of pattern configuration in a better condition, because the resist layer provides heat insulation at the lower layer.

Figure 4C:
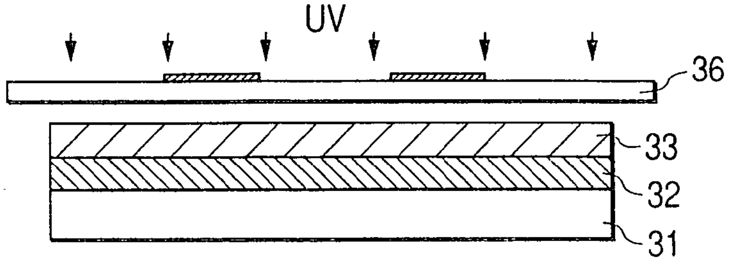

Next, as shown in FIG. 4C, the PMIPK layer serving as the positive type layer 33 is exposed. Here, it is preferable to use the cold mirror that reflects a wavelength of approximately 290 nm in good condition. For example, the cold mirror CM-290 is usable with the adoption of the mask-aligner PLA-621FA manufactured by Canon Incorporation.

Figure 4D:
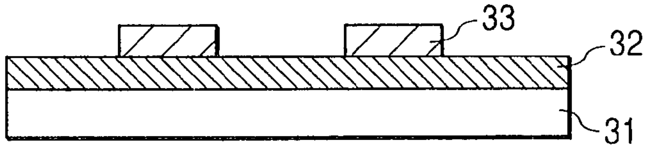

Next, as shown in FIG. 4D, the resist layer 33 at the upper layer is developed. It is preferable to use the methyl isobutyl ketone, which is the developer for PMIPK, but any solvent is applicable if only it can decompose the exposed portion of PMIPK, while keeping non-exposed portion undecomposed.

Figure 4E:
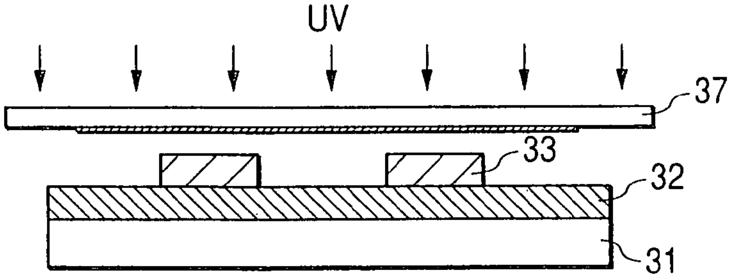

Further, as shown in FIG. 4E, the positive type resist layer 32 on the lower layer is exposed. This exposure is made by use of the cold mirror that reflects a wavelength of 250 nm. At this juncture, PMIPK on the upper layer is not exposed, because the photo-mask 37 does not allow light irradiation thereto.

Figure 4F:
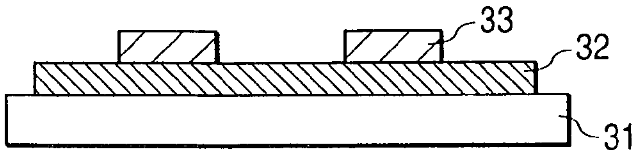

Next, as shown in FIG. 4F, the thermo-bridge positive type resist layer 32 is developed. It is preferable to make development by use of methyl isobutyl ketone, which is the same as the developer for the upper layer PMIPK, hence making it possible to eliminate any developer influence to be exerted on the upper layer pattern.

Figure 4G:
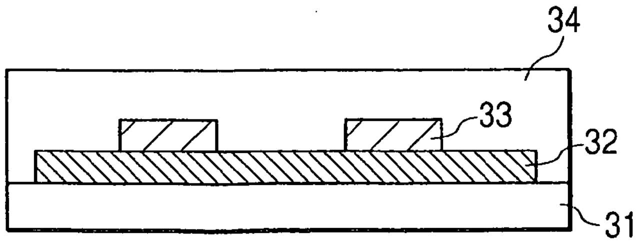

Next, as shown in FIG. 4G, liquid flow-path structural material 34 is coated to cover the thermo-bridge positive type resist layer 32 on the lower layer and the positive type resist layer 33 on the upper layer. For this coating, the solvent coating method, such as spin coating generally in use, is usable.

Figure 5A:
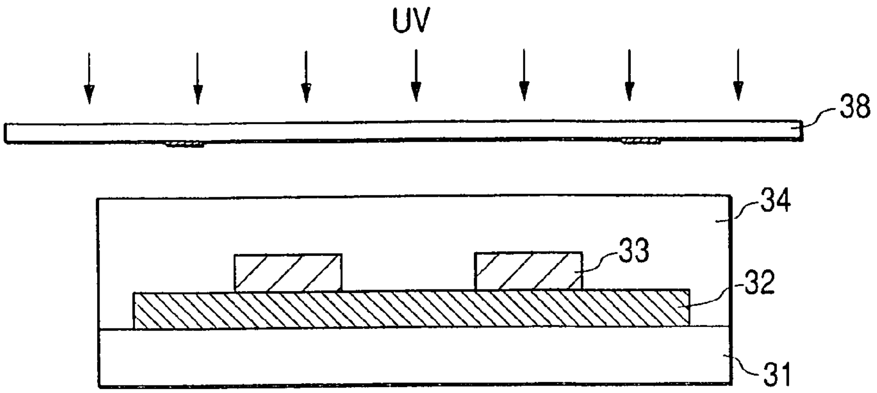
FIGS. 5A, 5B, 5C, and 5D are views that illustrate the continuation of the process flow shown in FIGS. 4A, 4B, 4C, 4D, 4E, 4F and 4G.

Liquid flow-path structural material is the one having the epoxy resin, which is in solid state at the room temperature, and the onium salt, which generates cation by light irradiation, as the main components thereof, as disclosed in Japanese Patent No. 3143307, and provides negative type characteristics. FIG. 5A shows the process in which the liquid flow-path structural material is given light irradiation. Here, in order not to allow light to be irradiated to the location where ink discharge port is formed, a photo-mask 38 is used.

Figure 5B:
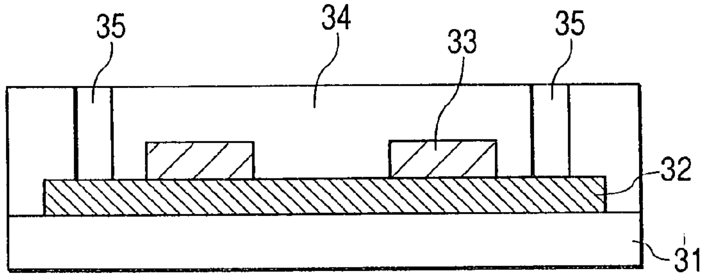

Next, as shown in FIG. 5B, the pattern of the ink discharge port 35 is developed against the photosensitive liquid flow-path structural material 34. For this patterning development, any one of exposure devices generally in use is applicable without problem. For this development of the photosensitive liquid flow-path structural material, it is preferable to use aromatic solvent, such as xylene, which does not decompose PMIPK. Also, when water repellent film should be formed on the liquid flow-path structural material, a photosensitive water repellent layer is formed as disclosed in the specification of Japanese Patent Laid-Open Application No. 2000-326515, and then, this can be implemented by exposure and development altogether. Here, the formation of the photosensitive water repellent layer can be made by means of laminating.

Figure 5C:
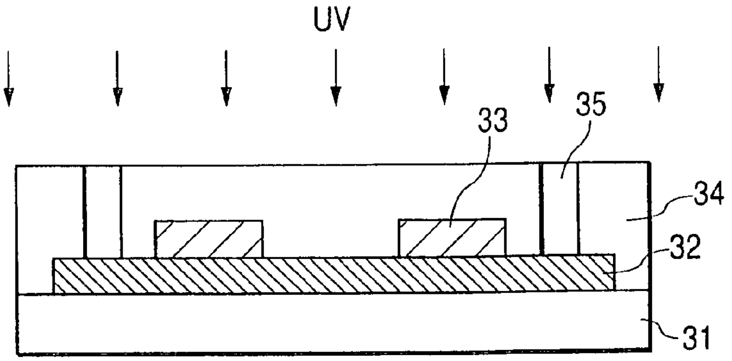

Next, as shown in FIG. 5C, it is arranged to irradiate ionizing radiation rays of 300 nm or less altogether beyond the liquid flow-path structural material. With this irradiation, PMIPK and bridge type resist are resolved into low molecule for the purpose of making removal thereof easier.

Figure 5D:
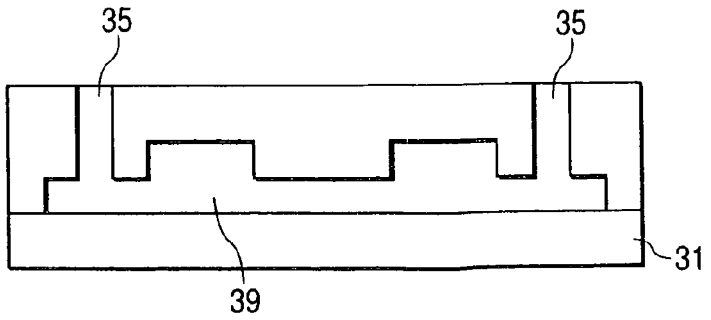

Lastly, the positive type resists 32 and 33 used for the formation of the model are removed by use of solvent. In this way, as shown in FIG. 5D, the liquid flow path 39 that includes the discharge chamber is formed.

By the application of the process described above, it is possible to change the height of the ink flow path from the ink supply port to the heater. With the capability provided by the method of manufacture of the kind for changing the height of the ink flow path from the ink supply port to the heater, it is possible to optimize the flow-path configuration from the ink supply port to the discharge chamber. This has not only significant relation to the speed at which ink is refilled in the discharge chamber, but also, makes it possible to reduce cross-talk between discharge chambers. In the specification of U.S. Pat. No. 4,882,595 of Trueba et al., there is a disclosure as to the relation between the aforesaid characteristics and the two-dimensional configuration, that is, the configuration in the direction parallel to the base plate, of the ink flow path formed on the base plate by means of the photosensitive resist. On the other hand, there is a disclosure in the specification of Japanese Patent Laid-Open Application No. 10-291317 of Murthy. et. al. that by use of excimer laser, resin liquid flow-path structural plate is processed in the three-dimensional directions, the direction within a plane and height direction, with respect to the base plate so as to change the height of the ink flow path.

However, there is often encountered a case where excimer laser processing makes it impossible to provide sufficient precision due to the expansion of film or the like. Particularly, the precision of processing by use of excimer laser in the depth direction of resin film is affected by the brightness distribution of laser or stability of laser light, thus making it impossible to secure precision good enough to distinguish the interrelations between the ink low path configuration and discharge characteristics. Consequently, there is no disclosure in the specification of Japanese Patent Laid-Open Application No. 10-291317 as to any distinct interrelations between the height configuration of the ink flow path and discharge characteristics.

In accordance with the present invention, the method of manufacture is executable by the solvent coating, such as spin coating, used for the semiconductor manufacturing technique. Therefore, the height of ink flow path can be formed stably in extremely high precision. Also, the formation of two-dimensional configuration parallel to the base plate can be implemented in a precision of sub-micron order by use of the photolithographic art used for semiconductor manufacturing.

By the application of these methods of manufacture, the inventors hereof have studied the interrelations between the height of ink flow path and the discharge characteristics. As a result, the following invention is designed. Now, in conjunction with FIGS. 6A and 6B to FIGS. 9A and 9B, the description will be made of the preferred embodiments of a liquid discharge head manufactured by the method thus designed by the present invention.

Figure 6A:
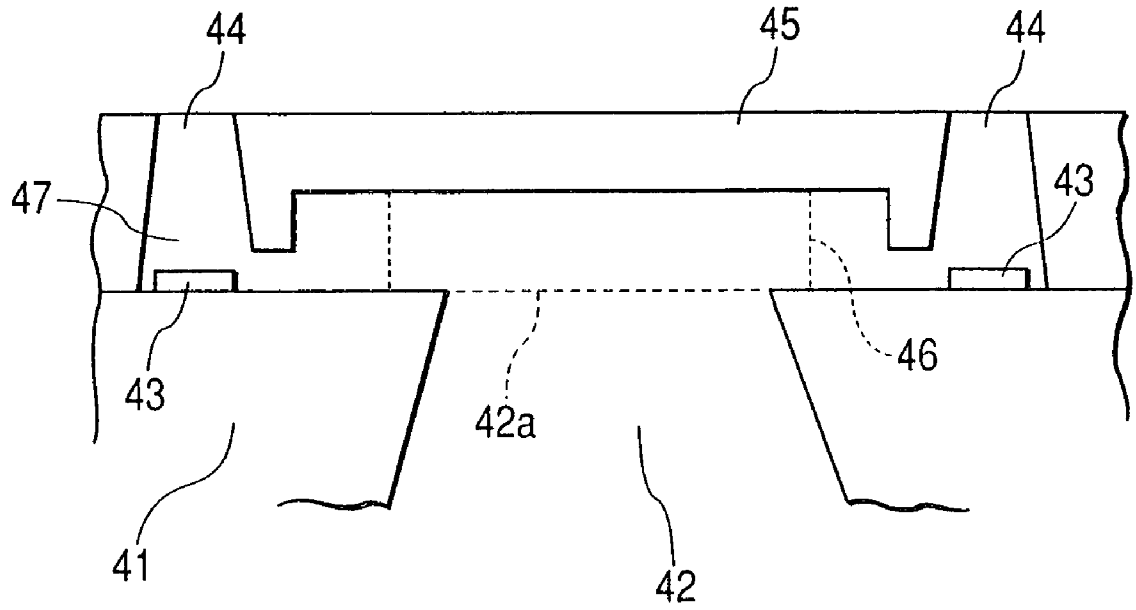
FIG. 6A is a vertically sectional view that shows the nozzle structure of an ink jet head having an improved recording speed by the method of manufacture in accordance with the present invention.
Figure 6B:
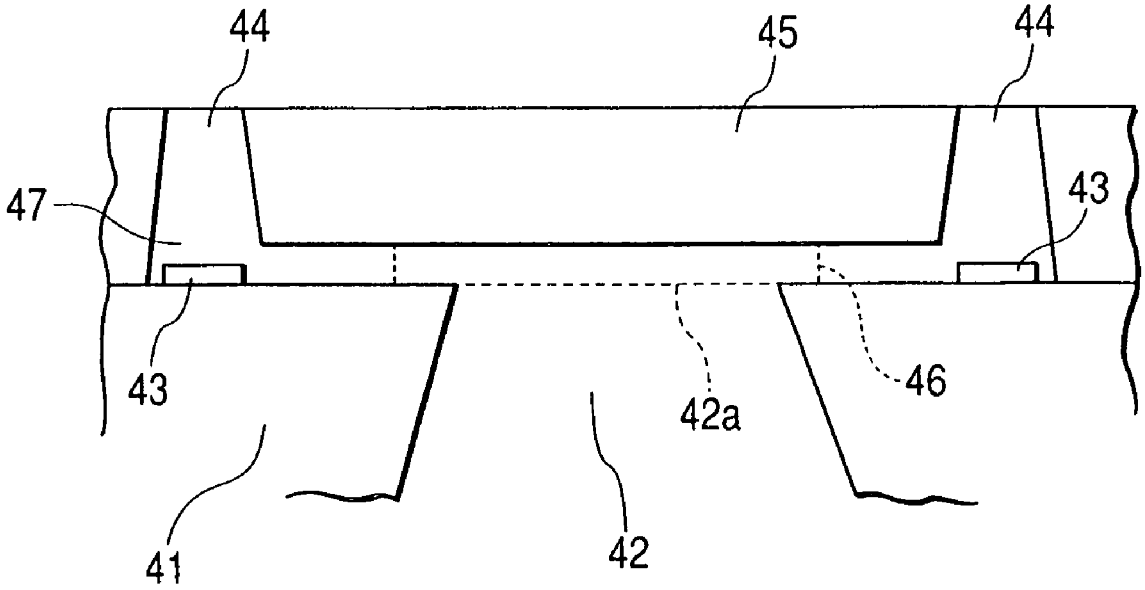
FIG. 6B is a vertically sectional view that shows the nozzle structure of an ink jet recording head manufactured by the convention method of manufacture.

As shown in FIG. 6A, a first embodiment of the head of the present invention is characterized in that the height of the ink flow path from the edge portion 42*a* of the ink supply port 44 to the discharge chamber 47 is made lower in the location adjacent to the discharge chamber 47. FIG. 6B is a view that shows an ink flow path configuration to be compared with that of the first embodiment. The speed at which ink is refilled in the discharge chamber 47 becomes faster when the height of the ink flow path is made higher from the ink supply port 42 to the discharge chamber 47, because the ink flow resistance becomes lower. However, when the height of the ink flow path is made higher, discharge pressure is released to the ink supply port 42 side, too, and the energy efficiency is made lower. Also, cross-talk between discharge chambers 47 become intense.

Therefore, the height of ink flow path is designed taking the aforesaid two kinds of characteristics into account. Now, by the application of the method of manufacture embodying the present invention, it becomes possible to change the height of ink flow path in order to materialize the ink flow path configuration shown in FIG. 6A. With the head the ink flow path of which is made higher from the ink supply port 42 to the discharge member 47, the flow resistance of ink is lowered to make high-speed refilling possible. Further, the structure is arranged to lower the height of ink flow path in the vicinity of the discharge chamber 47 in order to suppress the releasing of energy generated in the discharge chamber 47 to the ink supply port 42 side.

Figure 7A:
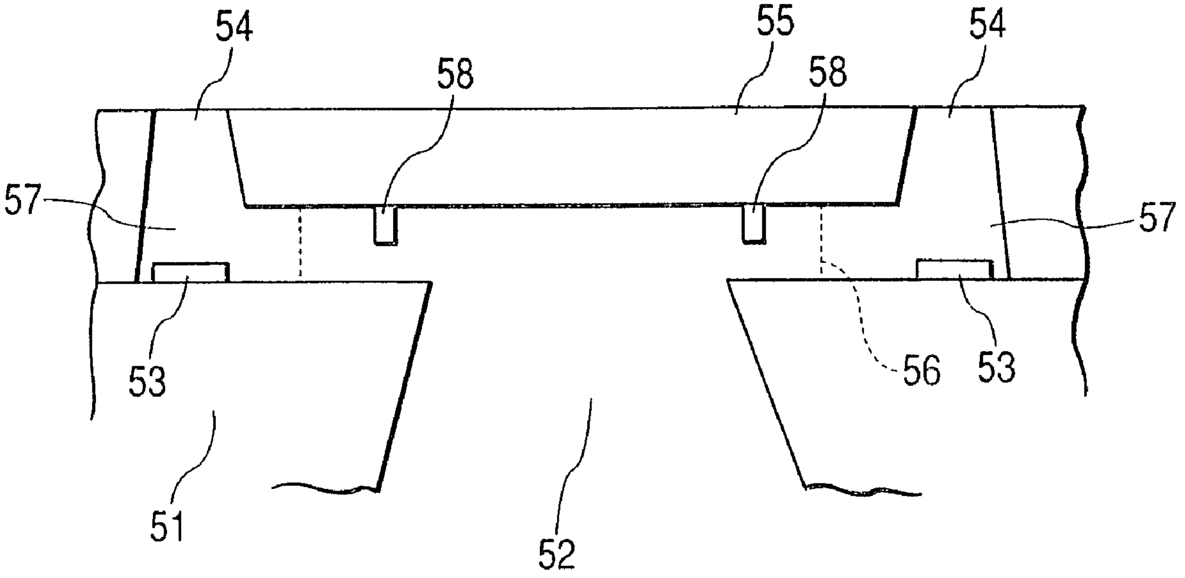
FIG. 7A is a vertically sectional view that shows an ink jet head having an improved configuration of noise filter by the method of manufacture in accordance with the present invention.
Figure 7B:
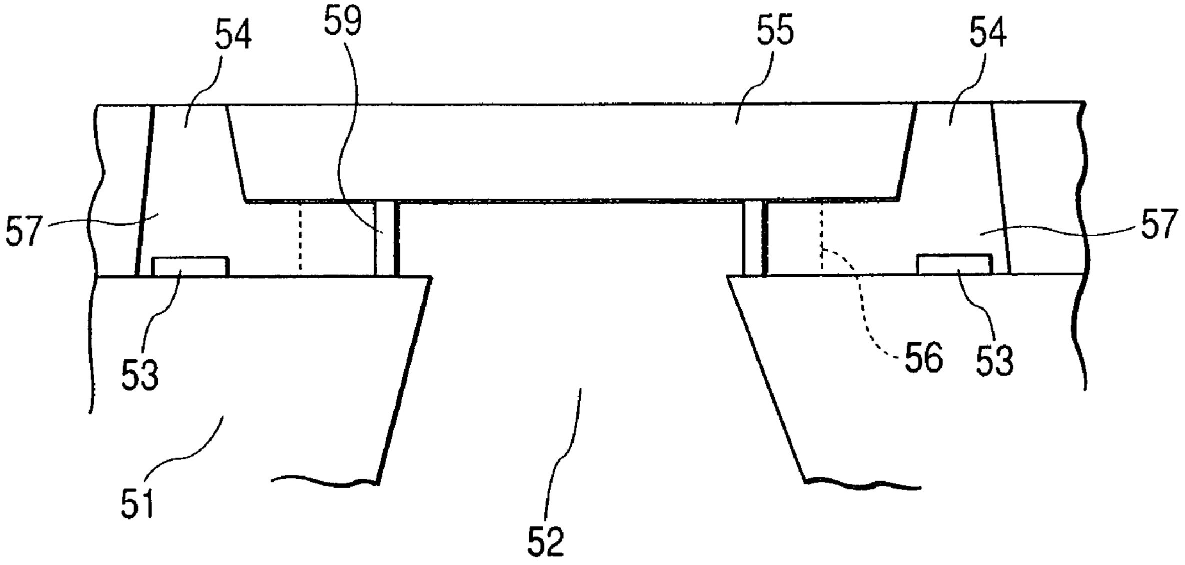
FIG. 7B is a vertically sectional view that shows an ink jet recording head having a noise filter of conventional configuration.

Next, FIGS. 7A and 7B are views that illustrate a head in accordance with a second embodiment of the present invention. This head is characterized in that a column type member that captures dust particles (hereinafter, referred to as a "nozzle filter") is formed in the ink flow path. Particularly, in FIG. 7A, the nozzle filter 58 is configured so that it does not reach the base plate 51. Also, FIG. 7B shows the structure of a nozzle filter 59 to be compared with that of the aforesaid second embodiment. These nozzle filters 58 and 59 bring about higher flow resistance of ink, causing the slower refilling speed of ink to the ink discharge chamber 57.

However, since the ink discharge port of an ink jet head for implementing higher image-quality recording is extremely small, dust particles or the like tend to clog the ink flow path or discharge port, hence the reliability of the ink jet head is degraded significantly, unless the aforesaid nozzle filter is installed. In accordance with the present invention, the area of ink flow path can be maximized, while keeping the interval between the adjacent nozzle-filters the same as conventionally provided, thus making it possible to capture dust particles, while controlling the flow resistance of ink so as not to be increased. In other words, the height of ink flow path is made changeable so that the flow resistance of ink is not allowed to become higher even if column type nozzle filters are installed in the flow path.

For example, when dust particles the diameter of which are 10 μm or more are to be captured, it is good enough if only the distance between the adjacent filers is set at 10 μm or less. Here, more preferably, if the column that forms the nozzle filer is arranged so as not to reach the base plate 51 as shown in FIG. 7A, the sectional area of the flow path can be made larger.

For example, when dust particle the diameter of which is 10 μm or more should be captured, it is good enough if only the distance between the adjacent filers is set at 10 μm or less. Here, more preferably, if the column that forms the nozzle filer is arranged so as not to reach the base plate 51 as shown in FIG. 7A, the sectional area of the flow path can be made larger.

Figure 8A:
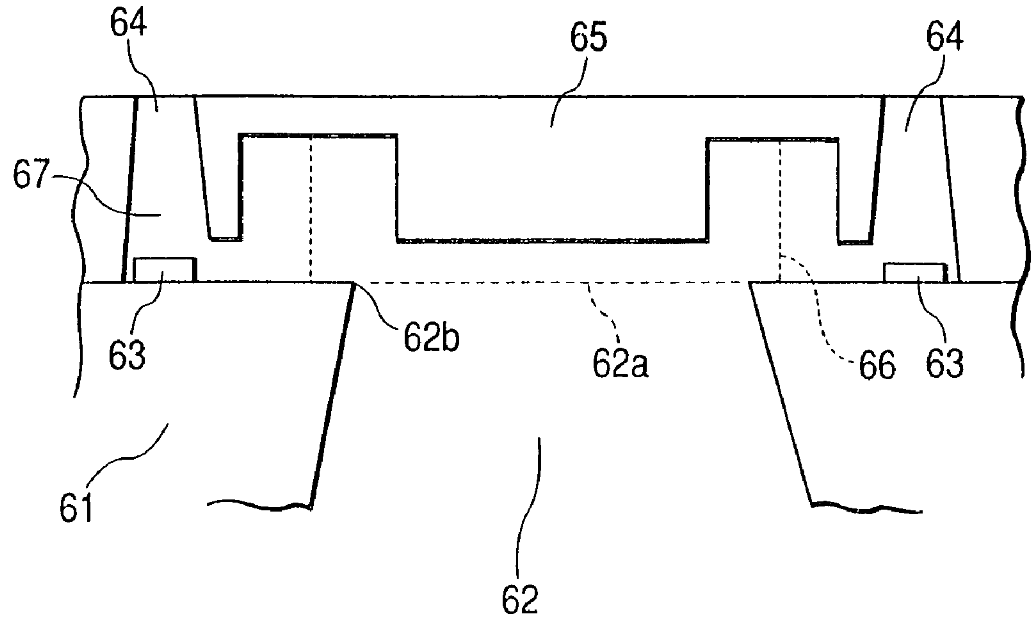
FIG. 8A is a vertically sectional view that shows the nozzle structure of an ink jet head, the strength of which is improved by the method of manufacture in accordance with the present invention.
Figure 8B:
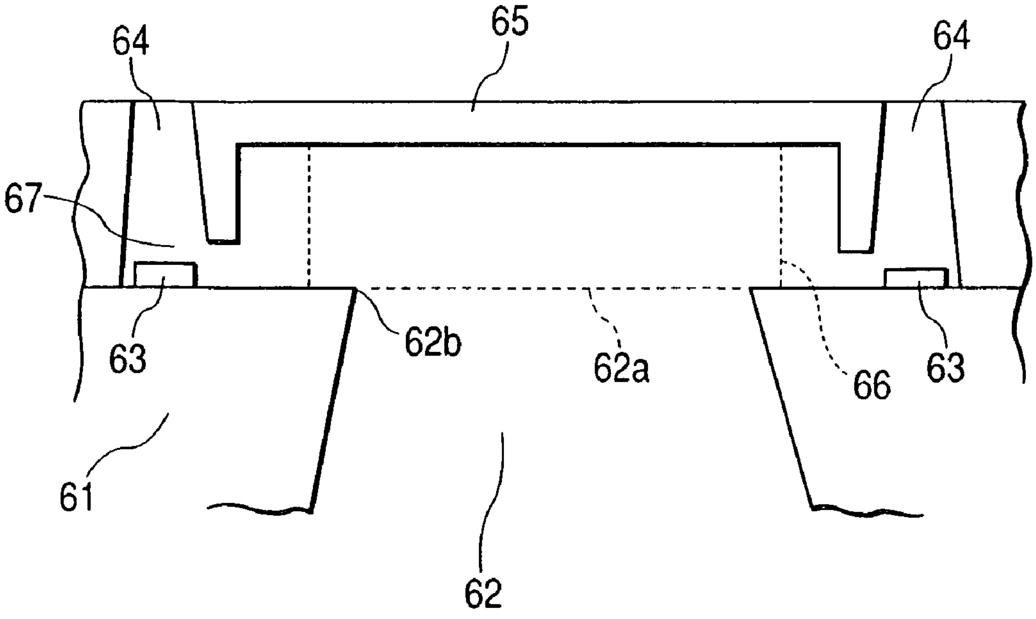
FIG. 8B is a vertically sectional view that shows the nozzle structure to be compared with the head represented in FIG. 8A.

Next, as shown in FIG. 8A, the head of a third embodiment of the present invention is such that the height of the ink flow path of the liquid flow-path structural material 65 that faces the central portion of the ink supply port 62 is made lower than that of the ink flow path portion that faces the opening edge 62b of the ink supply port 62. FIG. 8B is a view that shows the ink flow-path configuration to be compared with that of the third embodiment. Now referring to FIG. 6A, if the height of the ink flow path from the edge portion 42*a* to the ink supply port 42 to the discharge chamber 47 with respect to the aforesaid head structure, the film thickness of the liquid flow-path structural material 65, which faces the ink supply port 62, is made smaller, too, as shown in FIG. 8B, and there is a possibility that the reliability of the ink jet head is extremely degraded. For example, it is assumable that if jamming of a recording sheet should take place during recording or in a similar case, the film that forms the liquid flow-path structural material 65 is broken, leading to ink leakage.

However, as shown in FIG. 8A, the liquid flow-path structural material 65 that substantially faces the entire opening of the ink supply port 62 is made thick in accordance with the method of manufacture of the present invention, and the height of the flow path is made larger only for the portion that faces around the opening edge 62*b* of the ink supply port 62, which is needed for the intended ink supply. In this manner, the aforesaid drawback is avoided. Here, the distance from the opening edge 62*b* to the location where the height of flow path is formed to be higher for the liquid flow-path structural material 65 is determined by the amount of discharge of an ink jet head to be designed, and viscosity of ink used. In general, however, it is preferable to set such distance at approximately 10 to 100 μm.

Figure 9A:
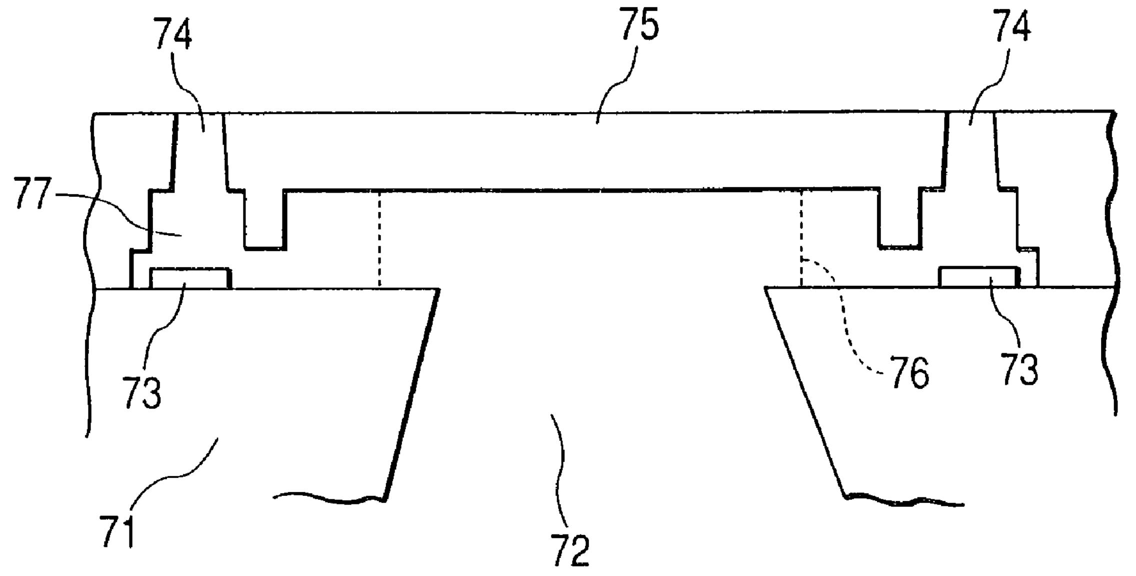
FIG. 9A is a vertically sectional view that shows the nozzle structure of an ink jet head, the discharge chamber of which is improved by the method of manufacture in accordance with the present invention.

Next, as shown in FIG. 9A, the head of a fourth embodiment of the present invention is characterized in that the configuration of the discharge port of the discharge chamber

Figure 9B:
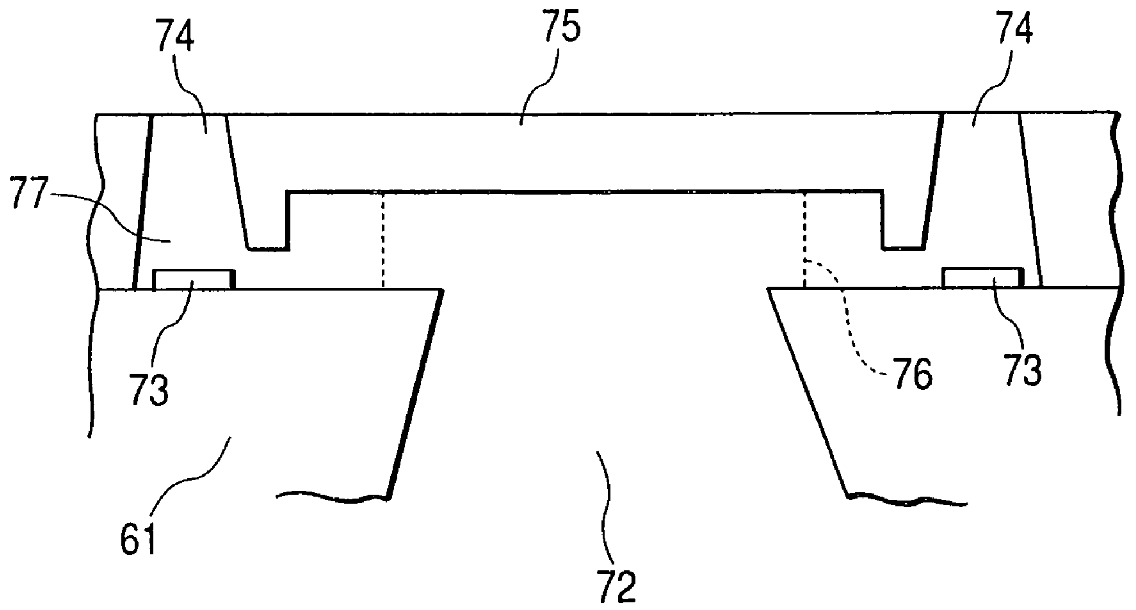
FIG. 9B is a vertically sectional view that shows the nozzle structure to be compared with the head represented in FIG. 9A.

77 presents a convex section. FIG. 9B is a view that shows the discharge port configuration of a discharge chamber to be compared with that of the fourth embodiment. The discharge energy of ink changes greatly depending on the flow resistance of ink regulated by the discharge port configuration above the heater. In accordance with the conventional method of manufacture, liquid flow-path structural material is patterned to form the discharge port configuration. Therefore, such configuration is the one, which is the projection of the discharge port pattern formed by a mask, and the discharge port is formed through the liquid flow-path structural material in the same area as the opening area of the discharge port on the surface of the liquid flow-path structural material in principle. However, in accordance with the method of manufacture of the present invention, the patterning shapes on the lower layer material and the upper layer material are changed to make it possible to provide the discharge port configuration of the discharge chamber 77 in the convex form. With the configuration thus made, it becomes possible to provide a recording head capable of making ink discharge speed faster, and also, producing an effect that linearity of ink is increased for recording in higher image quality.

Now, hereinafter, with reference to the accompanying drawings as required, the present invention will be described in detail.

First Embodiment

FIG. 10 to FIG. 19 are views each showing one example of the structure of liquid discharge recording head and the manufacturing procedures therefore, which are related to the method embodying the present invention. Here, in each of the examples, a liquid discharge recording head, which is provided with two orifices (discharge ports), is represented, but it is needless to mention that the invention is equally applicable to a high-density, multiply arrayed liquid discharge recording head, which is provided with orifices in a number more than two.

Figure 10:
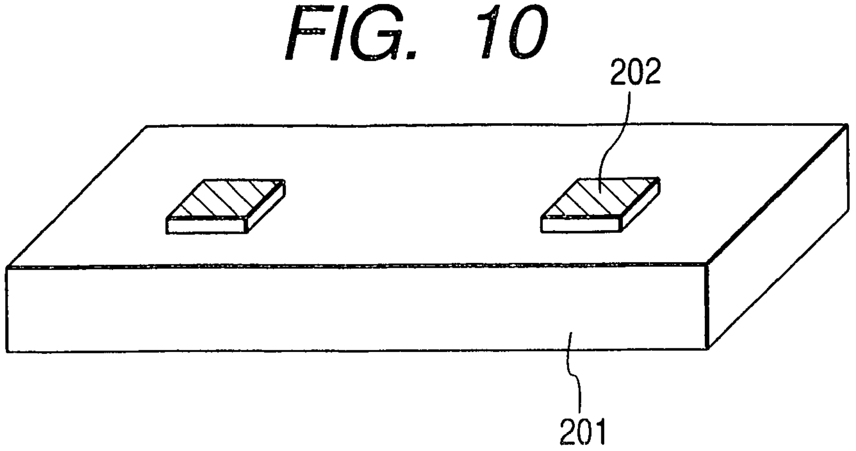
FIG. 10 is a perspective view that schematically illustrates a method of manufacture in accordance with one embodiment of the present invention.

At first, for the present embodiment, a base plate 201 formed by glass, ceramics, plastic, metal, or the like is used as shown in FIG. 10, for example.

Here, FIG. 10 is a view that schematically shows the base plate before the layer of photosensitive material is formed.

The base plate 201 of the kind can be used without any particular limitation as to the configuration, material, and the like if only it can function as a part of the wall member of liquid flow path, and also, functions to be the supporting member that supports the liquid flow-path structure formed by the layer of photosensitive material to be described later. On the base plate 201, liquid discharge generating element 202, such as electrothermal converting element or piezoelectric element, is arranged in a desired number (in FIG. 10, two pieces are shown, for instance). By use of the liquid discharge energy-generating element of the kind 202, discharge energy is given to ink liquid for discharging small droplets of recording liquid. In this respect, for example, when electrothermal converting element is used as the liquid discharge energy generating element 202, this element heats recording liquid nearby, and generates discharge energy. Also if piezoelectric element is used, for example, this element generates discharge energy by means of mechanical vibration.

Here, with the element 202, electrodes (not shown) are connected to input control signals for driving the element. Also, in general, for the purpose of enhancing the durability of the discharge energy-generating element 202, it is provided with various functional layers, such as protection layer. It is of course possible to provide such functional layers without any problem in accordance with the present invention, too.

As the base plate 201, silicon is used as the most versatile material therefore. In other words, the driver, logic circuit, and the like, which is needed for controlling the discharge energy-generating element, is produced by use of the semiconductor manufacturing method generally in use. For that matter, it is preferable to use silicon for the base plate. Also, as a method for forming through hole for supplying ink to the silicon base plate, it may be possible to apply the technology and technique related to YAG laser or sand blasting, among some others. However, when the thermo-bridge type resist is used as the lower layer material, resin film tends to hang down in the through hole during the pre-baking operation, because the pre-baking temperature of this resist is extremely high as described earlier, which is far beyond the glass transition temperature of resin. Therefore, it is preferable that no through hole is formed for the base plate when coating the resist. For a method of the kind, it is possible to apply silicon anisotropic etching technology and technique using alkali solvent. In this case, it should be good enough if a mask pattern is formed on the backside of the base plate using silicon nitride having resistance to alkali or the like, while a membrane film is formed on the surface of the base plate using the same material, which serves as the etching stopper.

Figure 11:
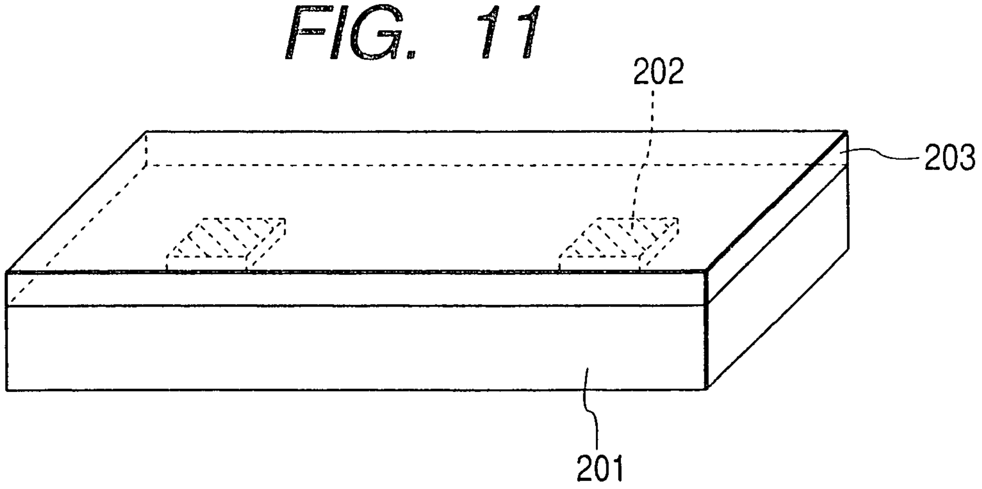
FIG. 11 is a perspective view that schematically illustrates the next step in the status of manufacture shown in FIG. 10.

Next, as shown in FIG. 11, on the base plate 201 that contains the liquid discharge energy-generating element 202, the bridge type positive layer 203 is formed. This material is the copolymer of methyl methacrylate and mathacrylic acid in a ratio of 90:10, which is sold on the market by American Polyscience Incorporation. The resin particles are dissolved in the concentration of cyclohexanone of 30 wt %, and used as resist liquid. This resist liquid is coated on the aforesaid base plate 201 by use of spin coat method, and pre-baked for 30 minutes in an oven at a temperature of 180° C. The film thickness of the film thus formed is 10 μm.

Figure 12:
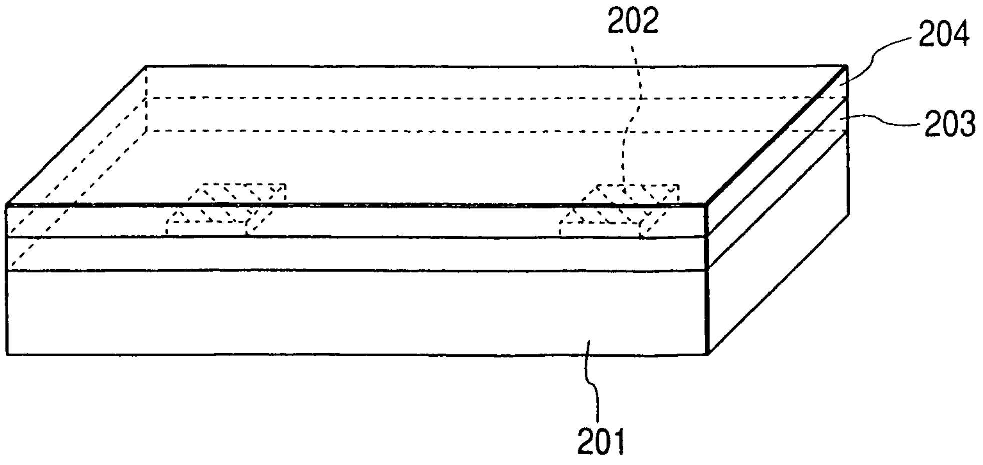
FIG. 12 is a perspective view that schematically illustrates the next step in the status of manufacture shown in FIG. 11.

Next, as shown in FIG. 12, on the thermo-bridge type positive resist layer 203, PMIPK positive resist layer 204 is coated. The PMIPK thus coated is obtained by adjusting the ODUR-1010 sold by Tokyo Oka Kogyo K.K. so that the resin density becomes 20 wt %. The pre-baking is performed by use of a hot plate for three minutes at a temperature of 140° C. The film thickness of this film is 10 μm.

Figure 13:
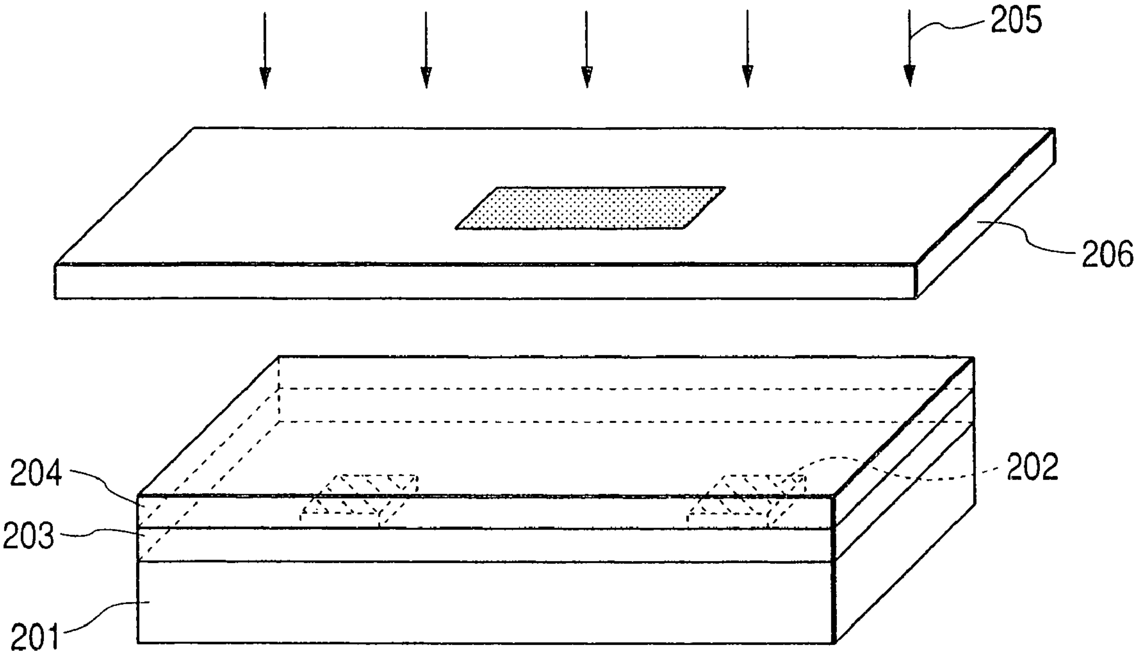
FIG. 13 is a perspective view that schematically illustrates the next step in the status of manufacture shown in FIG. 12.

Next, as shown in FIG. 13, the PMIPK positive resist layer 204 is exposed. The exposure device used therefor is the mask aligner PLA-621FA manufactured by Canon Incorporation, and the cold mirror used for this process is product number: CM-290. The exposure value is 2 J/cm$^2$.

The ionizing radiation 205, which is reflected from the cold mirror CM-290, is given to PMIPK for exposure through the photo-mask 206 having the pattern, which is desired to be left intact.

Figure 14:
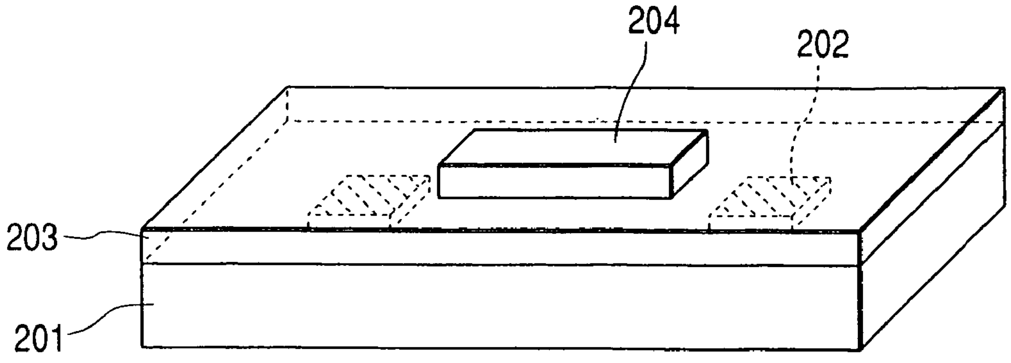
FIG. 14 is a perspective view that schematically illustrates the next step in the status of manufacture shown in FIG. 13.

Next, as shown in FIG. 14, the PMIPK positive resist layer 204 is developed for the pattern formation. Here, a seven-minute dipping in methyl isobutyl ketone is used for the development. At this juncture, the exposure value is set at 100 J/cm$^2$ using the cold mirror, which is needed for the pattern formation of the thermo-bridge type positive resist on the lower layer, and the photosensitivity ratio is 1:50. As a result, there is almost no change on the lower layer due to the aforesaid exposure and development.

Figure 15:
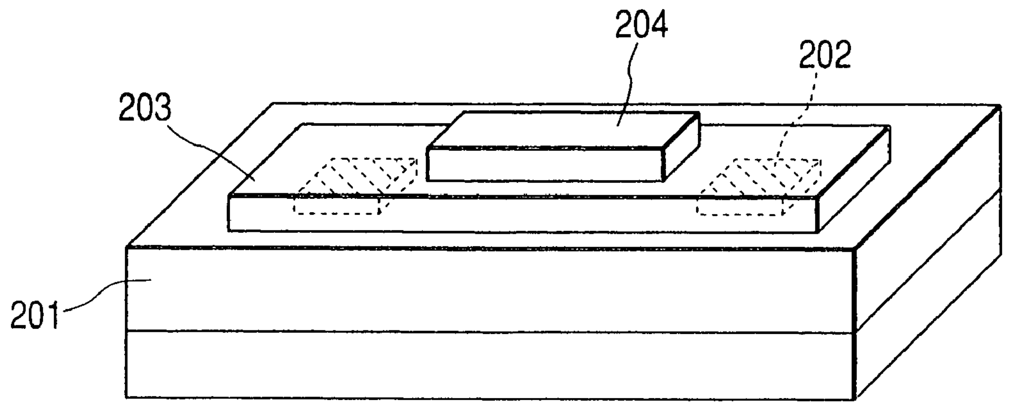
FIG. 15 is a perspective view that schematically illustrates the next step in the status of manufacture shown in FIG. 14.

Next, as shown in FIG. 15, the bridge type positive resist layer 203 on the lower layer is patterned (exposed and developed). The same exposure device is used, and the product number of the cold mirror used is: CM-250. At this juncture, the exposure value is 12 J/cm$^2$ and methyl isobutyl ketone is used for the development. The ionizing radiation reflected from the cold mirror CM-250 is irradiated to the thermo-bridge type positive resist for exposure through the photomask (not shown) having the pattern, which is desired to be left intact. At this juncture, diffracted light from the mask caused the PMIPK pattern on the upper layer is made thinner. Therefore, the remaining portion of PMIPK is designed in consideration of such portion that may be made thinner. There is of course no need for such design consideration of the mask if an exposure device to be used is provided with an optical system, which is not affected by any diffracted light.

Figure 16:
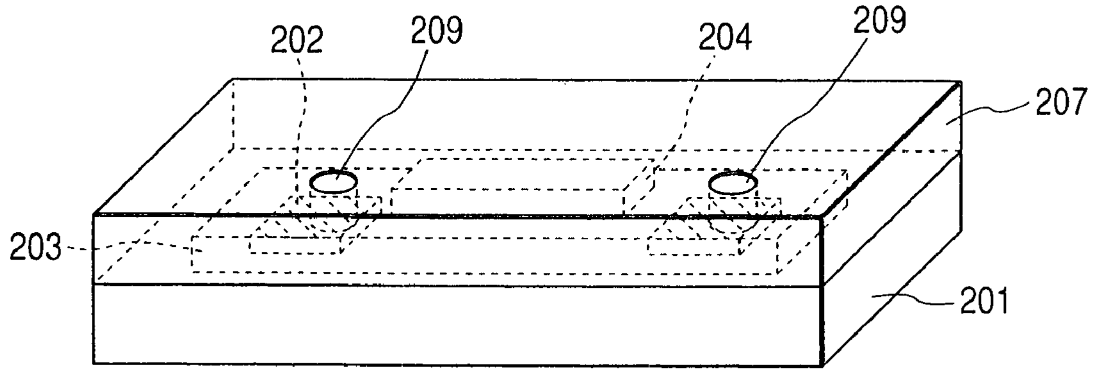
FIG. 16 is a perspective view that schematically illustrates the next step in the status of manufacture shown in FIG. 15.

Next, as shown in FIG. 16, the layer of liquid flow-path structural material 207 is formed to cover the patterned bridge type positive resist layer 203 on the lower layer and the positive resist layer 204 on the upper layer. The material of this layer is prepared by being dissolved into 50 portion of EHPE-3150 sold by Dicell Kagaku K.K., and 50 portion of xylene using one portion of optical cation polymeric starter SP-172 sold by Asahi Denka Kogyo K.K., and 2.5 portion of silane coupling agent A-187 sold by Nippon Unika K.K. as coating solvent.

Spin coating method is used for this coating, and the pre-baking is performed by use of a hot plate at 90° C. for 3 minutes. For exposure, the mask aligner MPA-600FA manufactured by Canon Incorporation is used with the exposure value of 3 J/cm$^2$ and development by dipping in xylene for 60 seconds. After that, baking is made at a temperature of 100° C. for one hour, thus enhancing the close contact capability of the liquid flow-path structural material.

Next, for the liquid flow-path structural material 207, the patterning exposure and development of the ink discharge port 209 are carried out. For this patterning exposure, any one of exposure devices generally in use can be used without problem. Here, at the time of exposure, a mask (not shown) is used in order not to irradiate light to the location where ink discharge port is formed.

After that, although not shown, cyclized isoprene is coated on the liquid flow-path structural material to protect this material layer from alkali solvent. The material used here is the one sold by Tokyo Oka Kogyo K.K. under the product name of OBC. Subsequently, then, the silicon base plate is dipped in solution of tetramethyl ammonium hydride (TMAH) of 22 wt % for 13 hours at a temperature of 83° C. to form a through hole (not shown) for ink supply. Also, for the formation of the ink supply port, the silicon nitride, which is used as a mask and membrane, is patterned in advance on the silicon base plate. After an anisotropic etching of the kind, the silicon base plate is installed on a dry etching device with the backside thereof being placed upward, and the membrane film is removed by use of the etchant, which is prepared by mixing oxygen of 5% in $CF_4$. Then, the aforesaid silicon base plate is dipped into xylene to remove OBC.

Figure 17:
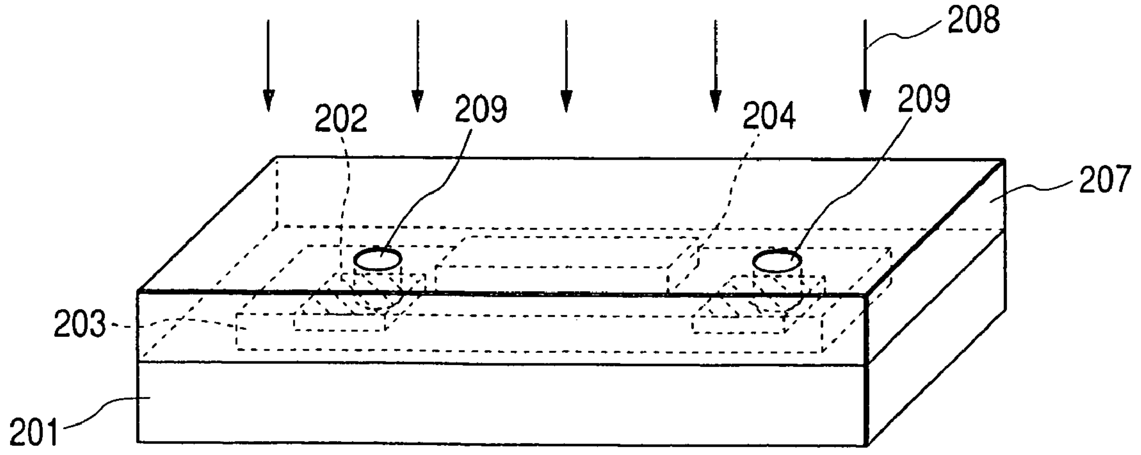
FIG. 17 is a perspective view that schematically illustrates the next step in the status of manufacture shown in FIG. 16.

Next, as shown in FIG. 17, using a low-pressure mercury lamp, ionizing radiation 208 of 300 nm or less is irradiated to the surface of the liquid flow-path structural material 207 to resolve the upper layer positive type resist of PMIPK and the bridge type positive resist. The irradiation value is 50 J/cm$^2$.

Figure 18:
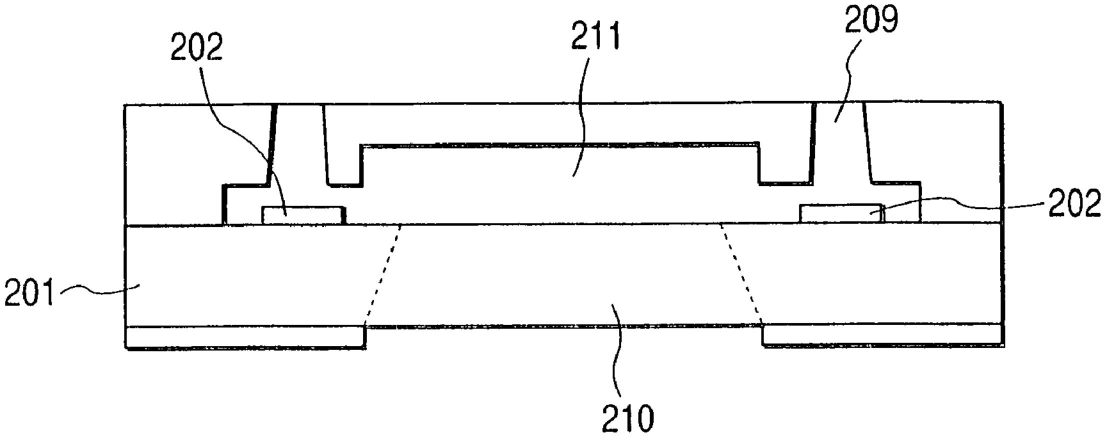
FIG. 18 is a perspective view that schematically illustrates the next step in the status of manufacture shown in FIG. 17.

After that, the base plate 201 is dipped in methyl lactate to remove model resists altogether as shown in FIG. 18, which is the vertically sectional view. At this juncture, the base plate is dipped in a mega-sonic bath of 200 MHz in order to attempt the elution thereof in a shorter period of time. In this way, the ink flow path 211 that contains the discharge chamber is formed in order to produce the structure of ink discharge element in which ink is inducted from the ink supply port 210 to each discharge chamber through each ink flow path 211 and discharged from the discharge port 209 by use of a heater.

Figure 19:
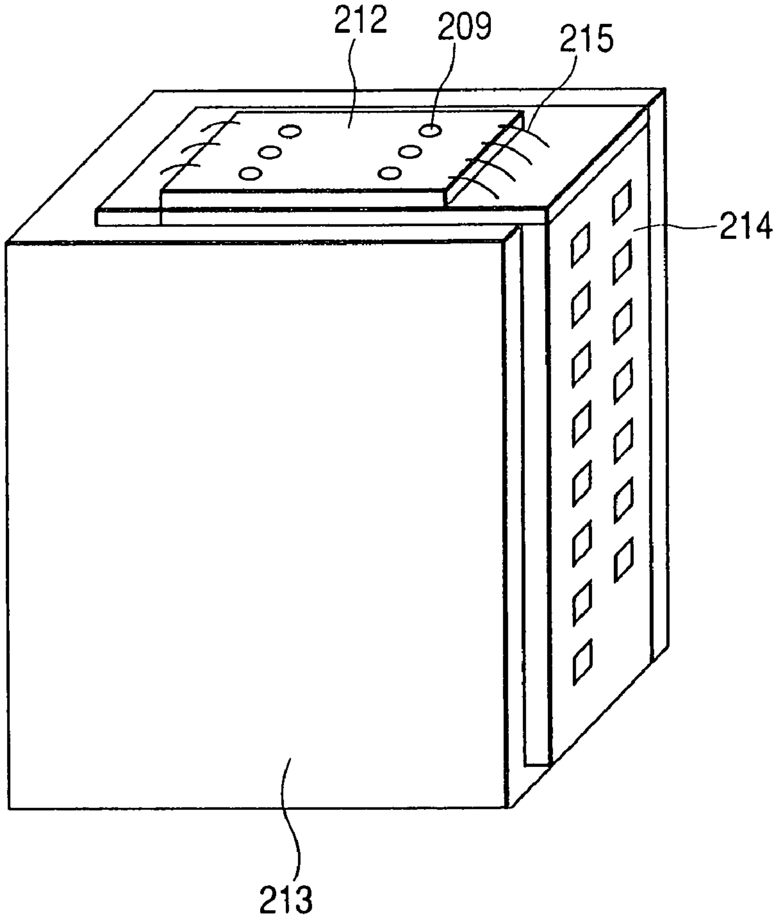
FIG. 19 is a perspective view that schematically shows the ink jet head unit having assembled thereon the ink discharge element obtained by the method of manufacture shown in FIG. 10 to FIG. 18.

The discharge element thus produced is assembled in an ink jet head unit the mode of which is shown in FIG. 19. Then, the discharge and recording performance thereof is evaluated with the result that image recording is possible in excellent condition. As shown in FIG. 19, the mode of this ink jet head unit is such that the TAB film 214, which is used for the transfer of recording signals from and to the main body of a recording apparatus, is provided for the outer surface of a holding member for detachably holding an ink tank 213, for example, and then, the ink discharge element 212 is connected with electric wiring by use of electric connection lead 215 on the TAB film 214.

Second Embodiment

The present embodiment describes a modal example in which methacrylate, which is not thermo-bridge type, is used for the lower layer resist. Here, however, the best mode is the one that uses the thermo-bridge type described in the first embodiment.

Now, the description is given below. At first, as the lower layer, polymethyl methacrylate (PMMA) is formed on the base plate in the same manner as the first embodiment.

PMMA is prepared for use by adjusting the ODUR-1000, which is product number on the market by Tokyo Oka Kogyo K.K., to the solid portion by concentration of 20 wt %. Next, PMIPK film is formed on the PMMA film by use of laminating method.

Here, on the polyethylene terephthalate film (thickness: 25 μm), which is given mold-strip treatment, PMIPK is coated by use of a roller coater to prepare the dry film thereof. The basic film is on the market by Teijin K.K., and the one that has the mold-strip treatment grade of A-53 is used.

Laminating is performed in a vacuum, and the temperature of the upper roller is 160° C. and that of the lower roller is 120° C.

Next, in the same manner as the first embodiment, the upper layer PMIPK is exposed and developed for the pattern formation. In this case, though slightly, the lower PMMA is gradually dissolved in the developer of methyl isobutyl ketone (MIBK). Therefore, the developing time is set at 90 seconds. Methyl ester methacrylate has a comparatively low dissolution again MIBK. As a result, influence exerted by the upper layer development is not given easily, but ethyl ester, butyl ester or the like of methacrylate tends to be easily dissolved by developer. Therefore, the tendency is that the process margin is further lowered.

Thereafter, an ink jet head is manufactured in the same manner as the first embodiment, and recording operation is performed with the result that image recording is possible in excellent condition.

Third Embodiment

Figure 20A:
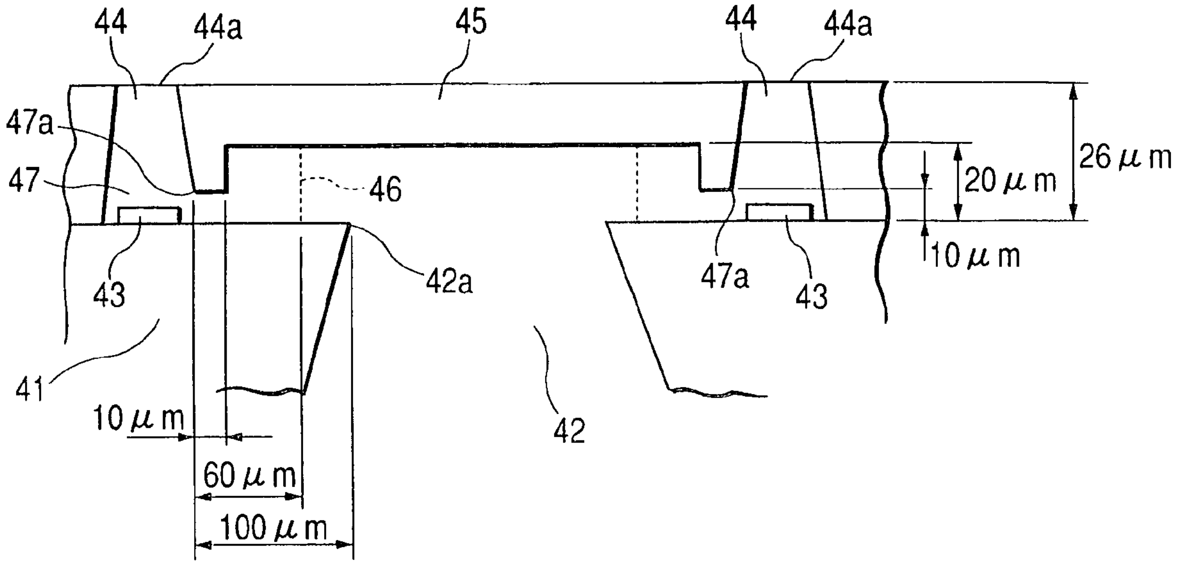
FIGS. 20A and 20B are views that illustrate the nozzle structures of heads manufactured by the conventional method and the method of the present invention, respectively, in order to compare the ink refilling capabilities thereof.
Figure 20B:
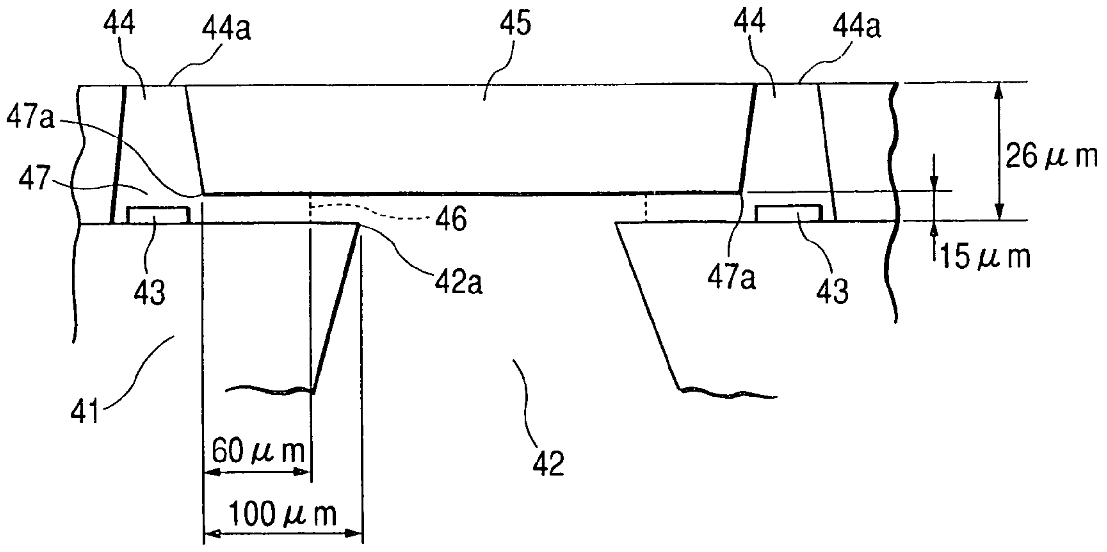

By the method of manufacture of the first embodiment, an ink jet head is produced in a structure as shown in FIG. 6A. As shown in FIGS. 20A and 20B, in accordance with the present embodiment, the horizontal distance from the opening edge 42*a* of the ink supply port 42 to the edge 47*a* of the discharge chamber 47 on the ink supply port side is 100 μm for this ink jet head. The ink flow path wall 46 is formed from the edge 47*a* of the discharge chamber 47 on the ink supply port side to a location at 60 μm on the ink supply port 42 side, and divides the respective discharge elements. Also, the height of the ink flow path is arranged to be 10 μm over the portion of 10 μm from the edge 47*a* of the discharge chamber 47 on the ink supply port side to the ink supply port 42 side, and 20 μm on the other portions. The distance from the surface of the base plate 41 to the surface of the liquid flow-path structural material 45 is 26 μm.

FIG. 20B is a view that shows the flow path section of an ink jet head manufactured by the conventional method in which the height of the ink flow path is arranged to be 15 μm all over the area.

For the heads shown in FIG. 20A and FIG. 20B, the refilling speeds subsequent to ink discharge are measured, respectively, with the result that it takes 45 μsec by the flow path structure shown in FIG. 20A, and 25 μsec by the flow path structure shown in FIG. 20B. It is thus found that the ink jet head manufactured by the method embodying the present invention makes it possible to perform ink refilling at extremely high speed.

Fourth Embodiment

A head having the nozzle filter, which is shown in FIG. 7A, is experimentally produced by the method of manufacture of the first embodiment.

Now, with reference to FIG. 7A, the nozzle filter 58 is formed by the column having a diameter of 3 μm on a position away from the opening edge of the ink supply port 52 by 20 μm toward the discharge chamber 57 side. The interval between column and column form the nozzle filter is 10 μm. The nozzle filter 59, which is provided by the conventional method of manufacture, is different in that it reaches the base plate 51 as shown in FIG. 7B, although the position and configuration are the same as those of the present embodiment.

The heads shown in FIG. 7A and FIG. 7B are experimentally produced, and the ink refilling speeds subsequent to ink discharge are measured, respectively, with the result that it takes 58 μsec by the filter structure shown in FIG. 7A, and 65 μsec by the filter structure shown in FIG. 7B. Then, it is found that by the ink jet head manufactured by method embodying the present invention, the ink-refilling period is made shorter.

Fifth Embodiment

By the method of manufacture of the first embodiment, an ink jet head structured as shown in FIG. 8A is experimentally produced.

With reference to FIG. 8A, the height of the ink flow path with respect to the ink supply port 62 is arranged in such a manner that it is formed to be higher up to the location 30 μm away from the edge 62*b* of the ink supply port 62 toward the center portion of the supply port, and that the layer thickness of the liquid flow-path structural material 65 is 6 μm. The height of the ink flow path with respect to the ink supply port 62 on the other portions than this location is arranged by the layer thickness of 16 μm of the liquid flow-path structural material 65. In this respect, the width of the ink supply port 62 is 200 μm, and the length thereof is 14 mm.

For the head shown in FIG. 8B, the layer thickness of the portion of the liquid flow-path structural material 65 is 6 μm on the portion corresponding to the ink supply port 62.

The head shown in FIGS. 8A and 8B are experimentally produced, respectively, and the dropping test is carried out for each head from a height of 90 cm, with the result that cracks are noticed in the liquid flow-path structural material 65 for 9 heads out of 10 heads structured as shown in FIG. 8B, but no crack is noticed in 10 heads structured as shown in FIG. 8A at all.

Sixth Embodiment

Figure 21A:
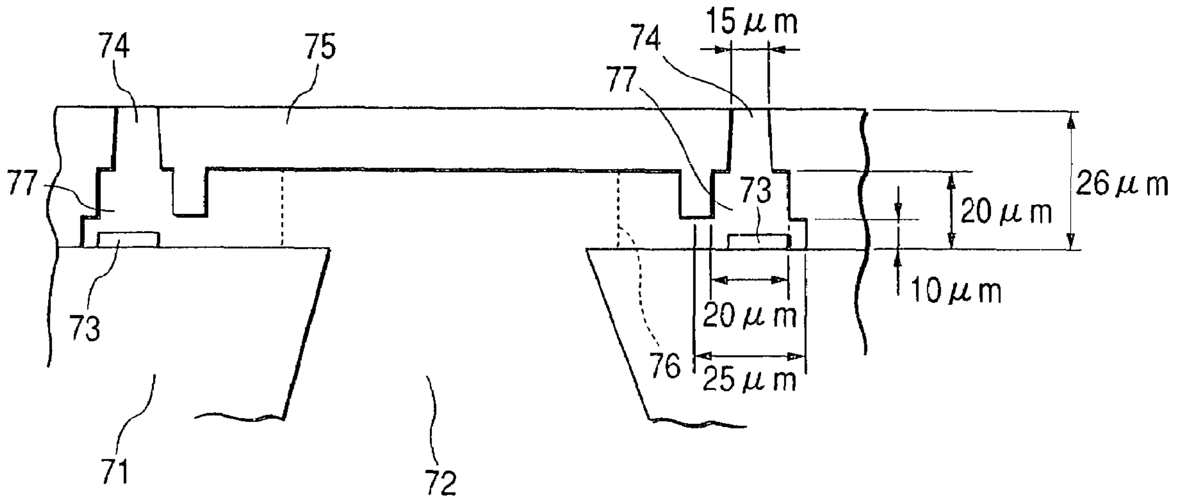
FIGS. 21A and 21B are views that illustrate the nozzle structures of heads manufactured by the conventional method and the method of the present invention, respectively, in order to compare the discharge characteristics thereof.

By the method of manufacture of the first embodiment, an ink jet head, which is structured as shown in FIG. 9A, is experimentally produced. As shown in FIG. 21A, the discharge chamber 77 is structured in accordance with the present embodiment in such a manner that the rectangular portion formed by the lower layer resist is a square of 25 μm having a height of 10 μm, and the rectangular portion formed by the upper layer resist is a square of 20 μm having a height of 10 μm, and then, the discharge port is formed by round hole having a diameter of 15 μm, and that the distance from the heater 73 to the opening surface of the discharge port 74 is 26 μm.

Figure 21B:
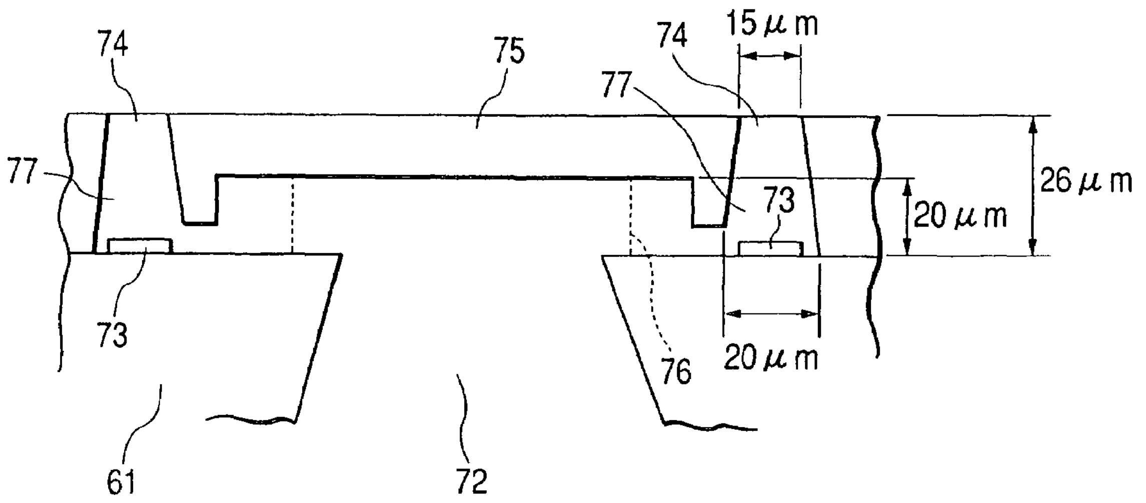

FIG. 21B shows the sectional configuration of the discharge port of a head produced by the conventional method of manufacture. The discharge chamber 77 is rectangular of 20 μm at one side, having the height of 20 μm, and the discharge port 74 is formed with a round hole of 15 μm diameter.

The discharge characteristics of the heads shown in FIGS. 21A and 21B are compared, respectively. As a result, it is found that the head shown in FIG. 21A has a discharge speed of 15 m/sec with a discharge amount of 3 ng, and that the displacement accuracy is 3 μm on a position 1 mm away in the discharge direction from the discharge port 74. Also, the head shown in FIG. 21B has a discharge speed of 9 m/sec with a discharge amount of 3 ng, and the displacement accuracy thereof is 5 μm.

As described above, the present invention produces the following effect:

(1) not only is it extremely easy to form the precise part of the liquid flow-path structure of a liquid discharge head, but also, it is easy to process large numbers of the liquid discharge heads at a time, each having the same structure, because the major process of manufacturing the head is performed by photolithographic art that uses photo-resist, photosensitive dry film, and the like.

(2) It is possible to change the height of liquid flow path partially so as to provide a liquid discharge head capable of effectuating faster refilling of recording liquid for higher-speed recording.

(3) It is possible to change the thickness of liquid flow-path structural material partially in order to provide a liquid discharge head having a higher mechanical strength thereof.

(4) It is possible to perform recording in high image quality, because the liquid discharge head can be manufactured to be able to discharge at high speed with extremely high displacement precision.

(5) It is possible to obtain a liquid discharge head having multi-array nozzles in high density by use of simple means.

(6) It is easy to change designs and controls, because the height of liquid flow path, and the length of orifice portion (discharge port portion) are easily controlled and changed by means of the thickness of coated film of resist film in high precision.

(7) It is possible to manufacture a liquid discharge head in good production yield, because the processing condition can be defined in extremely high process margin by use of thermo-bridge type positive resist.

What is claimed is:

1. A method for manufacturing a microstructure, said method comprising the following steps in order:

providing a stack of a plurality of resin layers including a first layer and a second layer on a surface of a base plate such that the second layer is disposed on the base plate, one of the first layer and the second layer having methacrylate as its main component and the other of the first layer and the second layer having polymethyl isopropenyl ketone as its main component;

irradiating light, of a first wavelength region to enable the first layer to react, to the first layer;

removing a portion of the first layer to which the light of a first wavelength region was irradiated;

irradiating light, of a second wavelength region different from the first wavelength region, to enable the second layer to react, to the second layer; and removing a portion of the second layer to which the light of the second wavelength region was irradiated.

2. A method for manufacturing a liquid discharge head having a flow path communicated with a discharge port for discharging liquid, said method comprising the following steps in order:

providing a stack of a plurality of resin layers including a first layer and a second layer on a surface of a base plate such that the second layer is disposed on the base plate, one of the first layer and the second layer having methacrylate as its main component and the other of the first layer and the second layer having polymethyl isopropenyl ketone as its main component;

irradiating light, of a first wavelength region to enable the first layer to react, to the first layer;

removing a portion of the first layer to which the light of the first wavelength region was irradiated to form a first pattern;

irradiating light, of a second wavelength region different from the first wavelength region, to enable the second layer to react, to the second layer;

removing a portion of the second layer to which the light of the second wavelength region was irradiated to form a second pattern;

providing a coating resin on the base plate so as to coat the first pattern and the second pattern;

forming the discharge port in the coating resin; and removing the first pattern and the second pattern to form the flow path.

* * * * *